United States Patent
Ohta et al.

(10) Patent No.: US 10,272,674 B2
(45) Date of Patent: Apr. 30, 2019

(54) RECORDING APPARATUS AND RECORDING METHOD

(71) Applicant: CANON KABUSHIKI KAISHA, Tokyo (JP)

(72) Inventors: Ayako Ohta, Kawasaki (JP); Takeshi Yazawa, Yokohama (JP); Hidehiko Kanda, Yokohama (JP); Eiji Komamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/717,241

(22) Filed: Sep. 27, 2017

(65) Prior Publication Data
US 2018/0093471 A1   Apr. 5, 2018

(30) Foreign Application Priority Data

Sep. 30, 2016  (JP) ................. 2016-192726

(51) Int. Cl.
*B41J 2/045* (2006.01)
*B41J 2/21* (2006.01)
*G06K 15/10* (2006.01)
*G06K 15/02* (2006.01)

(52) U.S. Cl.
CPC ......... *B41J 2/0456* (2013.01); *B41J 2/04586* (2013.01); *G06K 15/107* (2013.01); *B41J 2/2132* (2013.01); *G06K 15/1809* (2013.01)

(58) Field of Classification Search
CPC ...... B41J 2/2132; B41J 2/0456; B41J 2/2054; B41J 2/04586; G06K 15/107; G06K 15/1836; G06K 15/1843; H04N 1/4057
See application file for complete search history.

(56) References Cited

U.S. PATENT DOCUMENTS 7,284,823 B2 * 10/2007 Nishikori ............. B41J 11/0065
                                                  347/12
8,529,006 B2 *  9/2013 Goto ..................... B41J 2/2132
                                                  347/14

FOREIGN PATENT DOCUMENTS

JP    2003-127341 A    5/2003
JP    2009-039944 A    2/2009

* cited by examiner

*Primary Examiner* — Thinh H Nguyen
(74) *Attorney, Agent, or Firm* — Canon U.S.A., Inc. IP Division

(57) ABSTRACT

According to an embodiment of the present disclosure, there is provided a recording apparatus, wherein a quantization pattern is applied to a unit area in an end part area located at a boundary with a central area while being offset so as to correspond to an end part of the quantization pattern.

20 Claims, 20 Drawing Sheets

FIG. 1A
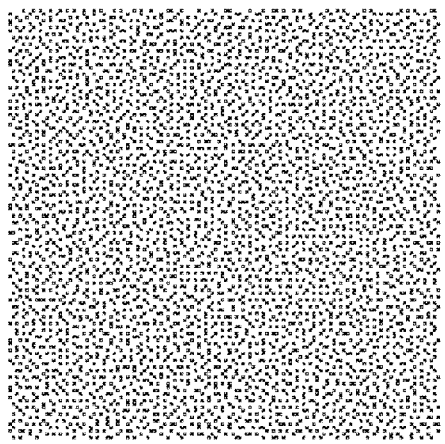
FIG. 1B1
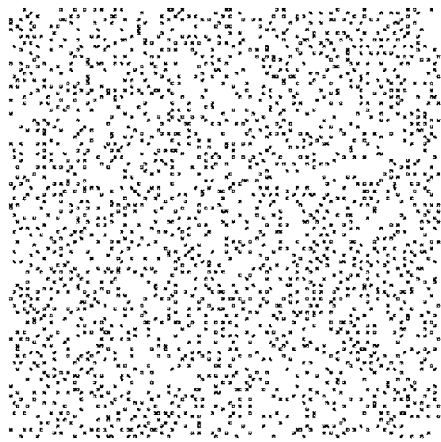
FIG. 1B2
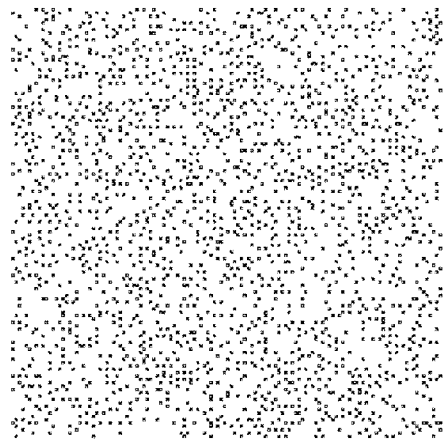
FIG. 1C1
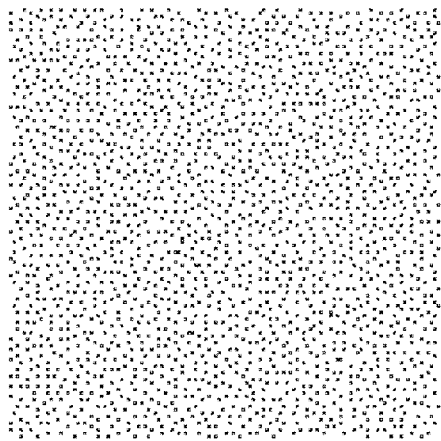
FIG. 1C2
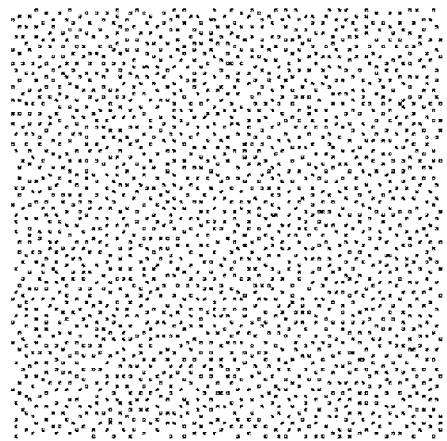

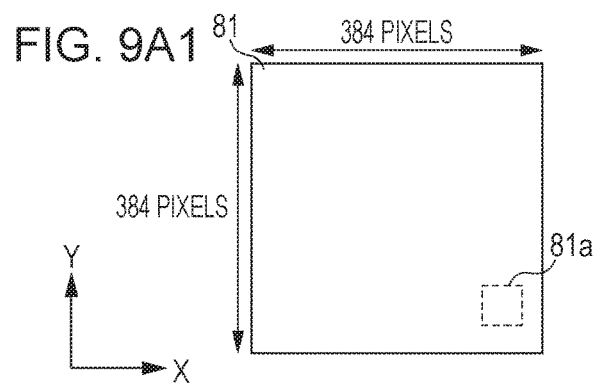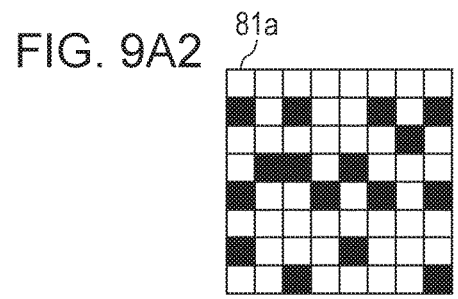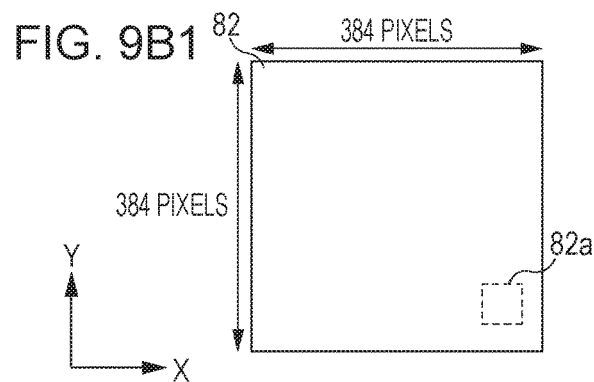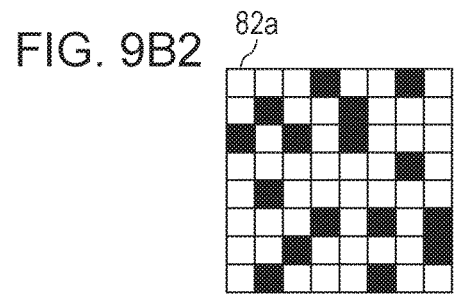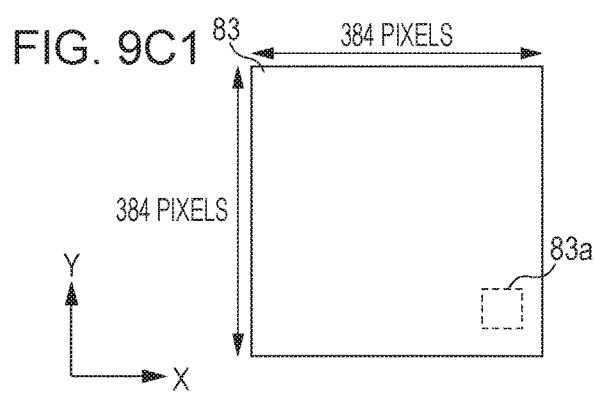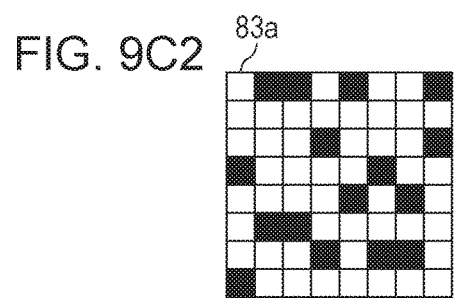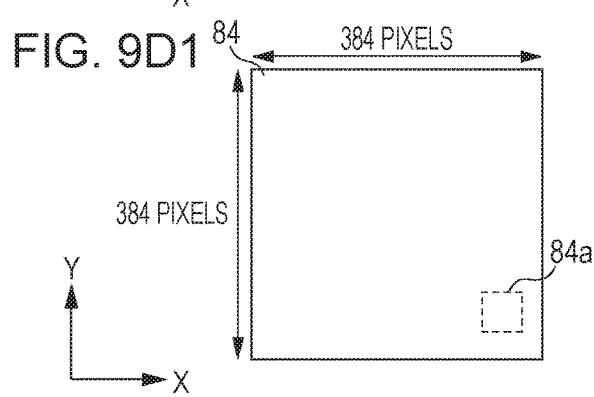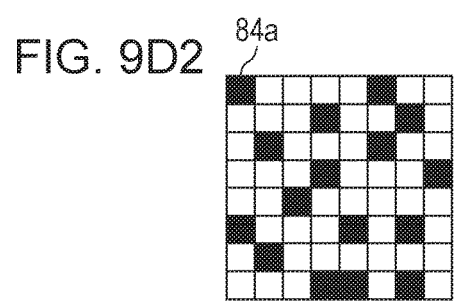

FIG. 15

| GRAYSCALE VALUE In OF MULTI-VALUE DATA | QUOTIENT N | REMINDER In' |
|---|---|---|
| 0 |  | 0 |
| 1 |  | 1 |
| 2 |  | 2 |
| 3 |  | 3 |
| ⋮ | 0 | ⋮ |
| 82 |  | 82 |
| 83 |  | 83 |
| 84 |  | 84 |
| 85 |  | 0 |
| 86 |  | 1 |
| 87 |  | 2 |
| 88 |  | 3 |
| ⋮ | 1 | ⋮ |
| 167 |  | 82 |
| 168 |  | 83 |
| 169 |  | 84 |
| 170 |  | 0 |
| 171 |  | 1 |
| 172 |  | 2 |
| 173 |  | 3 |
| ⋮ | 2 | ⋮ |
| 252 |  | 82 |
| 253 |  | 83 |
| 254 |  | 84 |
| 255 | 3 | 0 |

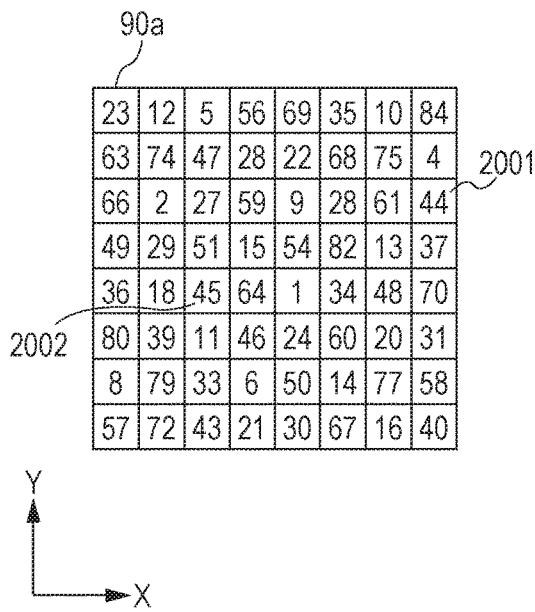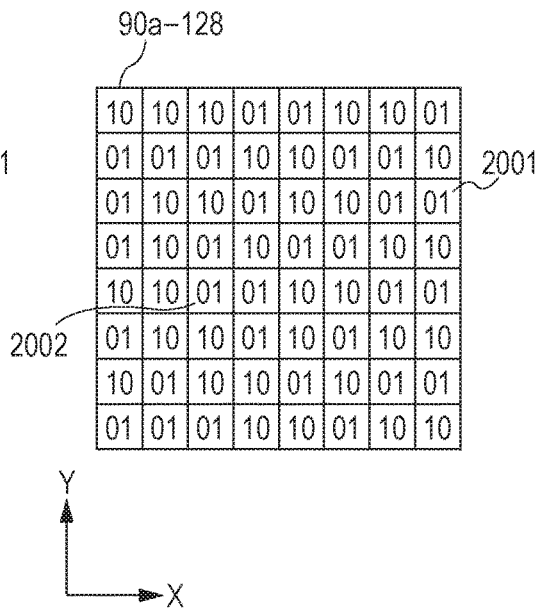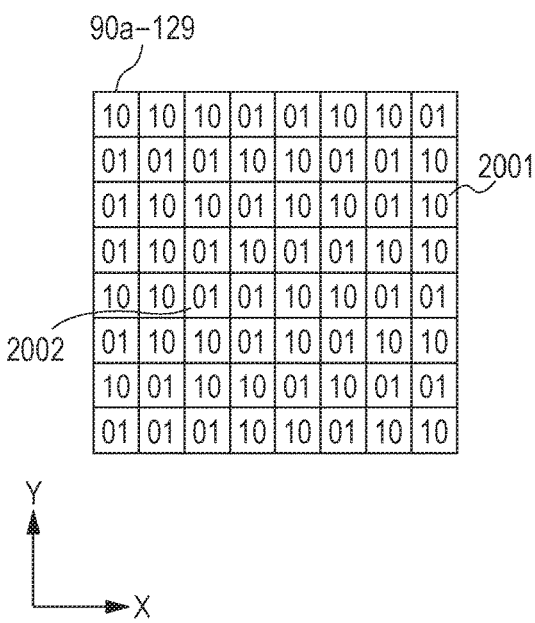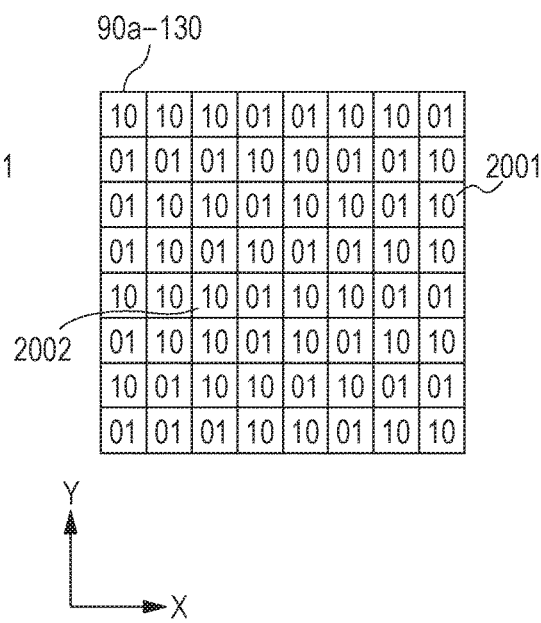

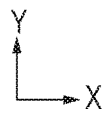

FIG. 19

| ○ : RECORDING<br>× : NON-RECORDING | | CODE VALUE OF MASK PATTERN | | | |
|---|---|---|---|---|---|
| | | 00 | 01 | 10 | 11 |
| PIXEL VALUE OF IMAGE DATA | 00 | × | × | × | × |
| | 01 | × | × | × | ○ |
| | 10 | × | × | ○ | ○ |
| | 11 | × | ○ | ○ | ○ |

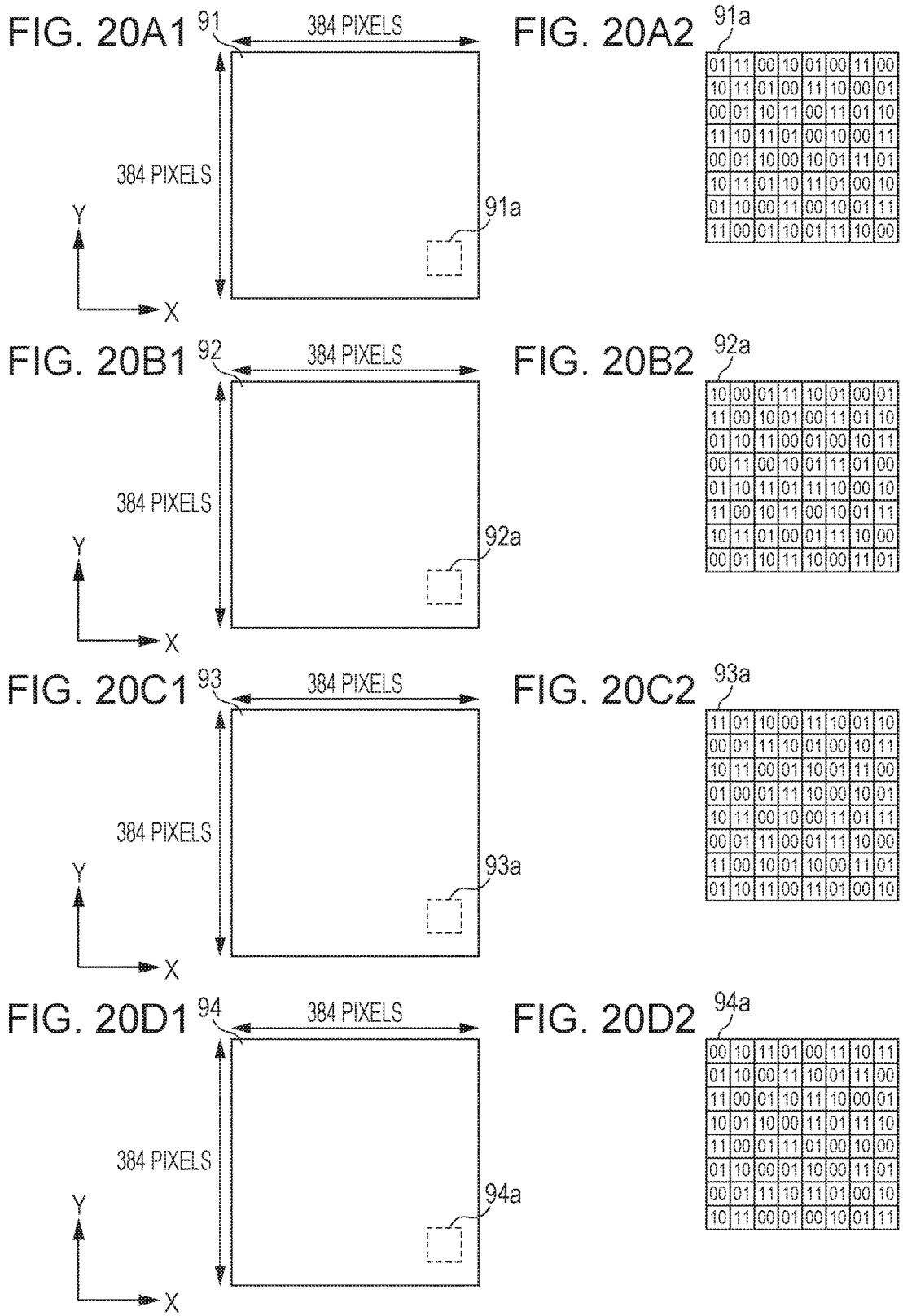

RECORDING APPARATUS AND RECORDING METHOD

BACKGROUND

Field of the Disclosure

The present disclosure relates to a recording apparatus and a recording method.

Description of the Related Art

A recording apparatus configured to record an image by repeatedly performing recording scanning and conveyance has been proposed. In the recording scanning, ink is ejected while a recording head including an ejection opening column where a plurality of ejection openings for ejecting the ink are arranged is moved relatively with respect to a unit area on a recording medium. In the conveyance, the recording medium is conveyed. In the above-described recording apparatus, a so-called multipass recording method has been proposed in which the scanning with respect to the unit area is performed plural times to form the image. According to the above-described multipass recording method, in general, multi-value data corresponding to the image to be recorded is quantized to generate quantized data, and furthermore, the quantized data is distributed to a plurality of scanning operations to generate recording data used for the recording. It has been disclosed that a quantization pattern is used when quantization processing is performed, and a plurality of mask patterns corresponding the plurality of scanning operations are used when distribution processing is performed.

Japanese Patent Laid-Open No. 2009-039944 discloses that binarization processing is performed by adopting a binarization pattern of a size in accordance with an amount of single conveyance of the recording medium in a case where the above-described quantization pattern and mask pattern are used. According to Japanese Patent Laid-Open No. 2009-039944, it is described that a plurality of binarization patterns having such sizes that the conveyance amount corresponds to an integer multiple of a width in an array direction of the ejection openings of the binarization pattern are prepared for each conveyance amount, and different binarization patterns in accordance with the conveyance amounts are adopted, so that it is possible to suppress an image quality degradation of the obtained image.

On the other hand, it has been suggested that a conveyance misalignment of the recording medium largely occurs when an end part in a conveyance direction of the recording medium is recorded as compared with a case where a central part is recorded, and as a result, an image quality of a recorded image in the end part of the recording medium may be degraded in some cases. In contrast to this, Japanese Patent Laid-Open No. 2003-127341 discloses that the number of used ejection openings is decreased when the end part of the recording medium is recorded, and a conveyance amount per operation is shortened. According to Japanese Patent Laid-Open No. 2003-127341, it is possible to perform the recording in which an influence from the conveyance misalignment of the recording medium is suppressed.

Herein, in a case where the quantization pattern for performing the quantization processing and a mask pattern for performing distribution processing are used, a spatial deviation may occur in the image based on the generated recording data in some cases if the respective patterns are determined in an uncorrelated manner. To reduce the above-described deviation, the quantization pattern and the mask pattern need to be determined while being associated with each other.

FIGS. 1A, 1B1, 1B2, 1C1, and 1C2 illustrate an example of recording data generated in a case where the quantization pattern and the mask pattern are determined in an uncorrelated manner and a case where the quantization pattern and the mask pattern are determined while being associated with each other. It should be noted that a case where the quantization pattern and the mask pattern each have the size of 128 pixels×128 pixels is illustrated as an example herein. In addition, a case where binarization processing is executed is illustrated as an example of quantization.

FIG. 1A illustrates quantized data having a recording duty at 25% when quantization is performed by using a certain quantization pattern.

FIGS. 1B1 and 1B2 respectively illustrate recording data for the first scanning operation and the second scanning operation generated when the quantized data illustrated in FIG. 1A is distributed for the first scanning operation and the second scanning operation by using respective mask patterns for the first scanning operation and the second scanning operation determined in an uncorrelated manner with respect to a quantization pattern.

FIGS. 1C1 and 1C2 respectively illustrate recording data for the first scanning operation and the second scanning operation generated when the quantized data illustrated in FIG. 1A is distributed for the first scanning operation and the second scanning operation by using the respective mask patterns for the first scanning operation and the second scanning operation determined while being associated with the quantization pattern. It should be noted herein that the association between the quantization pattern and each mask pattern is performed such that a dispersibility becomes high in a logical product of the quantized data generated by using the quantization pattern and each mask pattern.

As may be understood from FIGS. 1B1 and 1B2, in a case where the quantization pattern and the mask pattern are mutually determined in an uncorrelated manner, the spatial deviation may occur in a recorded image in some cases. It should be noted that the spatial deviation of the recorded image refers to a state in which the pixels where the ejection of the ink is determined by the recording data are not dispersed, and those pixels are locally concentrated.

In contrast to this, as illustrated in FIGS. 1C1 and 1C2, when the quantization pattern and the mask pattern determined while being associated with each other are used, it is possible to generate the recording data having the high dispersibility in which the spatial deviation of the recording data is reduced.

However, a method of performing the recording by using the above-described quantization pattern and the mask pattern determined while being associated with each other in which a throughput is improved is not found in a case where the conveyance amount is changed in accordance with the area on the recording medium as described in Japanese Patent Laid-Open No. 2003-127341.

SUMMARY OF THE DISCLOSURE

The present disclosure has been made in view of the above-described circumstances and aims at performing recording in which a spatial deviation of an image is suppressed while a throughput is improved.

In view of the above, according to an aspect of the present disclosure, there is provided a recording apparatus that performs recording by using a recording head including a plurality of ejection openings for ejecting ink which are arranged in an array direction, the recording apparatus including a scanning unit configured to cause the recording head to perform a plurality of scanning operations relatively in a scanning direction intersecting with the array direction with respect to a unit area on a recording medium, a conveyance unit configured to convey, after a recording operation with respect to the recording medium is started, the recording medium in a conveyance direction intersecting with the scanning direction by a first conveyance amount until a first scanning operation by the scanning unit is performed and convey the recording medium in the conveyance direction by a second conveyance amount which is longer than the first conveyance amount after the first scanning operation by the scanning unit is performed, an obtaining unit configured to obtain multi-value data corresponding to an image recoded on the recording medium, a quantization unit configured to generate quantized data by repeatedly applying a quantization pattern to the multi-value data in the array direction; a distribution unit configured to generate recording data used for the plurality of scanning operations by distributing the quantized data to the plurality of scanning operations on a basis of a plurality of mask patterns corresponding to the plurality of scanning operations, each of the plurality of mask patterns being determined while being mutually associated with the quantization pattern, and a control unit configured to control the recording operation in a manner that the ink is ejected on a basis of the generated recording data, in which the quantization unit applies the quantization pattern to the multi-value data while being offset in the array direction such that an end part on an upstream side in the conveyance direction in a first unit area where recording is performed for a first time in a scanning operation following the first scanning operation corresponds to an end part on the upstream side in the conveyance direction of the quantization pattern.

Further features of the present disclosure will become apparent from the following description of exemplary embodiments with reference to the attached drawings.

BRIEF DESCRIPTION OF THE DRAWINGS

FIGS. 1A, 1B1, 1B2, 1C1, and 1C2 are schematic diagrams for describing a spatial deviation of recording data, as provided in the prior art.

FIGS. 9A1, 9A2, 9B1, 9B2, 9C1, 9C2, 9D1, and 9D2 are schematic diagrams illustrating mask patterns according to an exemplary embodiment of the subject disclosure.

FIG. 15 is an explanatory diagram for describing the quantization processing according to an exemplary embodiment of the subject disclosure.

FIGS. 17A to 17D are explanatory diagrams for describing the quantization processing according to an exemplary embodiment of the subject disclosure.

FIGS. 18A, 18B, 18C1 to 18C4, 18D1 to 18D4, and 18E are explanatory diagrams for describing the distribution processing according to an exemplary embodiment of the subject disclosure.

FIG. 19 is an explanatory diagram for describing the distribution processing according to an exemplary embodiment of the subject disclosure.

FIGS. 20A1, 20A2, 20B1, 20B2, 20C1, 20C2, 20D1, and 20D2 are schematic diagrams illustrating the mask patterns according to an exemplary embodiment of the subject disclosure.

DESCRIPTION OF THE EMBODIMENTS

Hereinafter, exemplary embodiments of the present disclosure will be described in detail with reference to the drawings.

First Exemplary Embodiment

Figure 2A:
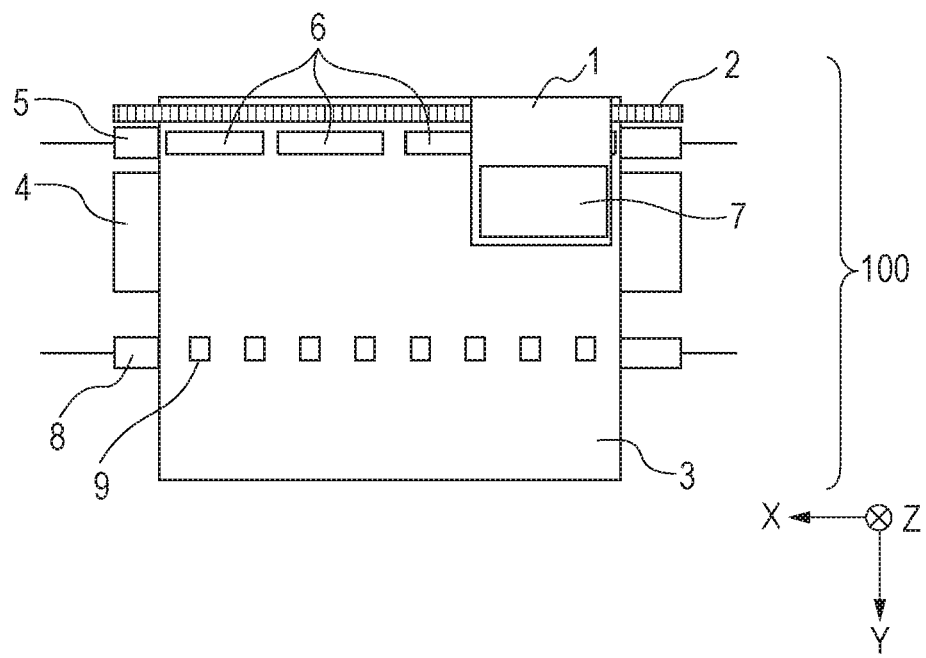
FIGS. 2A and 2B are perspective views of a recording apparatus applied to an exemplary embodiment of the subject disclosure.
Figure 2B:
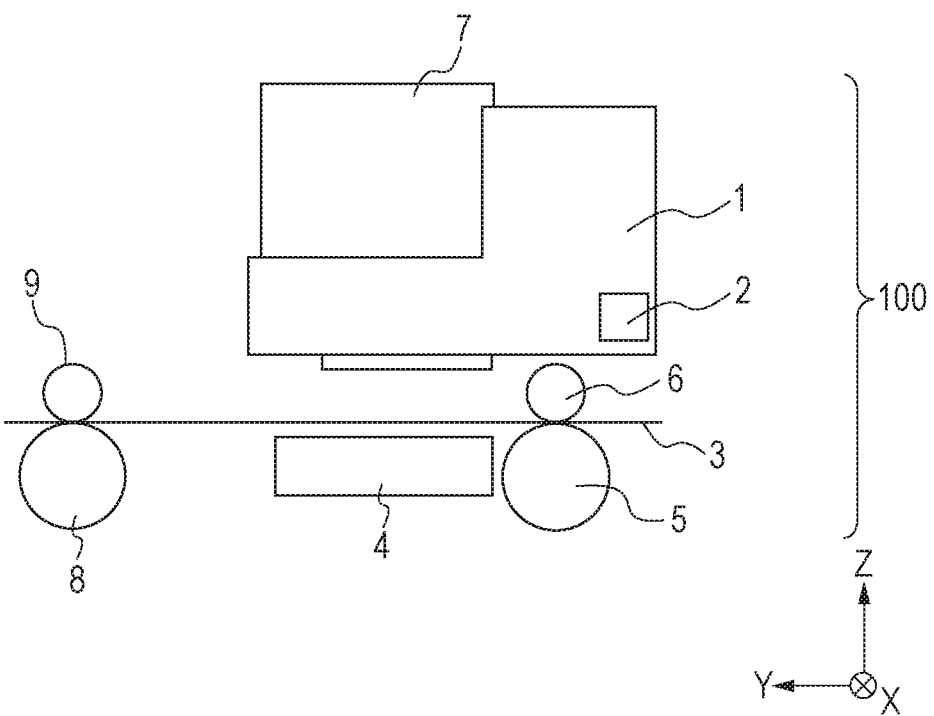

FIG. 2A is a schematic diagram illustrating an inside of an inkjet recording apparatus according to the present exemplary embodiment (hereinafter, will be also referred to as a recording apparatus or a printer) 100 as viewed from the top (downstream side in a Z direction). FIG. 2B is a cross sectional view of the inside of the recording apparatus 100 along a Y-Z plane.

A carriage 1 supports a recording head 7 (which will be described below) configured to eject ink of a plurality of colors and causes the recording head 7 to scan along a carriage belt 2 in an X direction (scanning direction) intersecting with a Y direction (conveyance direction). While the above-described scanning of the recording head 7 is performed, recording is performed on the recording medium 3 by ejecting the ink onto a recording medium 3 supported by a platen 4 from the recording head 7.

Two conveyance roller pairs are provided in the vicinity of the recording head in the Y direction. One is a feeding roller pair constituted by a feeding roller 5 and a pinching roller 6 while being provided on a −Y direction side (upstream side in the conveyance direction) with respect to the recording head. The other one is a discharging roller pair constituted by a discharging roller 8 and a pinching roller 9 while being provided on a +Y direction side (downstream side in the conveyance direction) with respect to the recording head. It should be noted that the feeding roller 5 and the discharging roller 8 are formed by a member continuous in the X direction, and the pinching rollers 6 and 9 are formed while being divided in the X direction. When the feeding roller 5 and the discharging roller 8 are rotated during the above-described scanning of the recording head 7 while the recording medium 3 is nipped by the feeding roller pair and the discharging roller pair, the recording medium 3 is conveyed on the +Y direction side.

Figure 3:
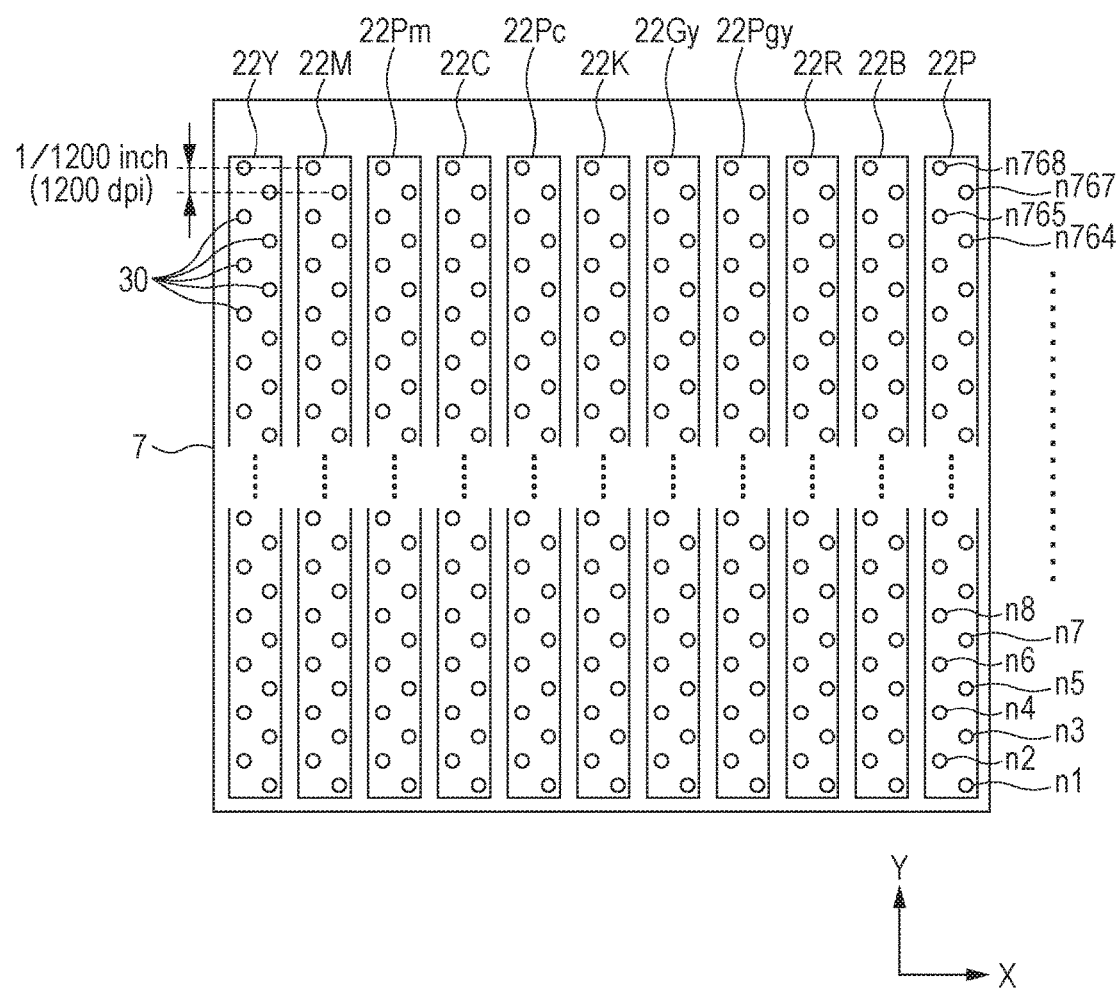
FIG. 3 is a schematic diagram of a recording head applied to an exemplary embodiment of the subject disclosure.

FIG. 3 illustrates the recording head used in the present exemplary embodiment.

A recording head 7 is constituted by arranging 11 ejection opening columns 22Y, 22M, 22Pm, 22C, 22Pc, 22Bk, 22Gy, 22Pgy, 22R, 22B, and 22P (hereinafter, one of the ejection opening column among these opening columns will be also referred to as an ejection opening column 22), from which respective ink including yellow (Y), magenta (M), photo magenta (Pm), cyan (C), photo cyan (Pc), black (Bk), gray (Gy), photo gray (Pgy), red (R), blue (B), and processing liquid (P) having a purpose of protecting a recording surface, improving a uniformity of glossiness, or the like other than coloring can be respectively ejected, in the X direction in the stated order. These ejection opening columns 22 are constituted by arranging 768 ejection openings (hereinafter, will be also referred to as nozzles) 30 for ejecting the respective ink at a density of 1200 dpi in the Y direction (array direction). Therefore, the ejection opening columns 22 have a length equivalent to 768 pixels in the Y direction. It should be noted that the mutual ejection openings 30 located to be adjacent to each other in the Y direction are arranged at positions mutually shifted in the X direction. Herein, the ejection amount of ink ejected at a time from the single ejection opening 30 according to the present exemplary embodiment is approximately 4.5 ng.

It should be noted that, for simplicity in the following explanation, the ejection opening 30 located to be the farthest on the −Y direction side among the 768 ejection openings in the respective ejection opening columns 22 is referred to as n1. The ejection opening 30 adjacent to n1 on the +Y direction side is referred to as n2. Furthermore, the ejection opening 30 adjacent to n2 on the +Y direction side is referred to as n3. Similarly, the respective ejection openings 30 are referred to as n4 to n768. The ejection opening 30 located to be the farthest on the +Y direction side among the 768 ejection openings in the respective ejection opening columns 22 becomes n768.

The ejection opening columns 22 are connected to ink tanks that are not illustrated in the drawing and store respectively corresponding ink to perform ink supply. It should be noted that the recording head 7 and the ink tank used in the present exemplary embodiment may be integrally constituted or may have a configuration in which the recording head 7 and the ink tank can be separated from each other.

Figure 4:
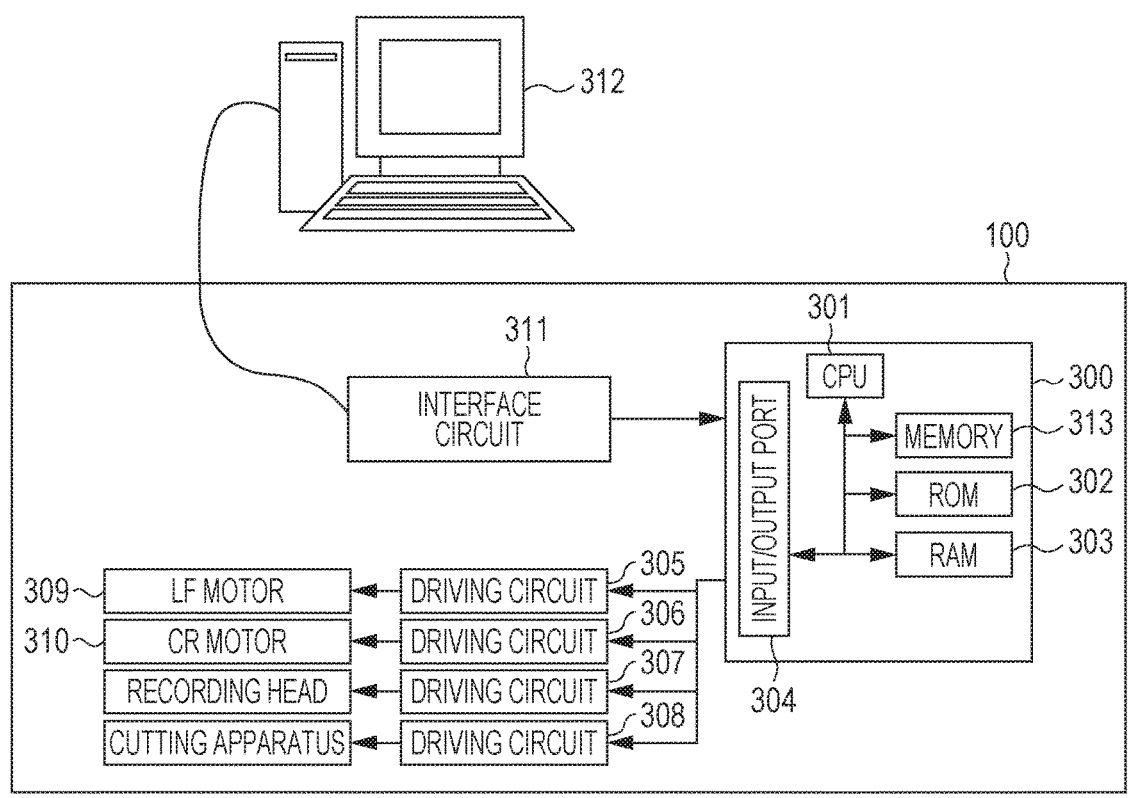
FIG. 4 is a schematic diagram illustrating a recording control system according to an exemplary embodiment of the subject disclosure.

FIG. 4 is a block diagram illustrating an outline configuration of a control system according to the present exemplary embodiment. A main control unit 300 is provided with a CPU 301 configured to execute processing operations such as calculation, selection, determination, and control and recording operations, a ROM 302 that stores a control program to be executed by the CPU 301, a RAM 303 used as a recording data buffer or the like, an input/output port 304, and the like. A memory 313 stores image data which will be described below, a mask pattern part, a quantization pattern, and the like. A conveyance motor (LF motor) 309, a carriage motor (CR motor) 310, and respective driving circuits 305, 306, 307, and 308 such as actuators in the recording head 7 and a cutting apparatus are connected to the input/output port 304. Furthermore, the main control unit 300 is connected to a personal computer (PC) 312 functioning as a host computer via an interface circuit 311.

Multipass Recording Method

According to the present exemplary embodiment, the recording head forms an image in accordance with a so-called multipass recording method in which the recording head is caused to perform the scanning operation plural times with respect to a unit area on the recording medium to perform the recording. According to the multipass recording method, the recording medium is generally conveyed between the scanning operations of the recording head, but while a conveyance misalignment of the recording medium is taken into account, according to the present exemplary embodiment, the conveyance of the recording medium is performed while a conveyance amount is varied in accordance with a position on the recording medium.

As described with reference to FIGS. 2A and 2B, according to the present exemplary embodiment, the two conveyance roller pairs including the feeding roller pair normally arranged on the −Y direction side with respect to the recording head 7 and the discharging roller pair normally arranged on the +Y direction side with respect to the recording head 7 perform a conveyance operation while the recording medium 3 is nipped. In a state in which the recording medium 3 is nipped by the two conveyance roller pairs as described above, the conveyance misalignment of the recording medium 3 hardly occurs.

It should be noted however that, when the ink is ejected from the recording head 7 to an end part on the +Y direction side (downstream side in the conveyance direction) of the recording medium 3 (hereinafter, which will be also referred to as a leading end part), the recording medium 3 is not nipped by the discharging roller pair, and the recording medium 3 is nipped only by the feeding roller pair. Similarly, when the ink is ejected to an end part on the −Y direction side (upstream side in the conveyance direction) of the recording medium 3 (hereinafter, which will be also referred to as a trailing end part), the nipping of the recording medium 3 by the feeding roller pair is not performed. In this manner, when the recording is performed on the leading end part and the trailing end part of the recording medium 3, since the recording medium is conveyed by only one of the conveyance rollers, the conveyance misalignment is likely to occur.

Therefore, according to the present exemplary embodiment, the recording medium 3 is divided along the Y direction into three areas including a central area, a leading end area, and a trailing end area, and the conveyance operation is executed while the conveyance amount is varied for each area.

Figure 5:
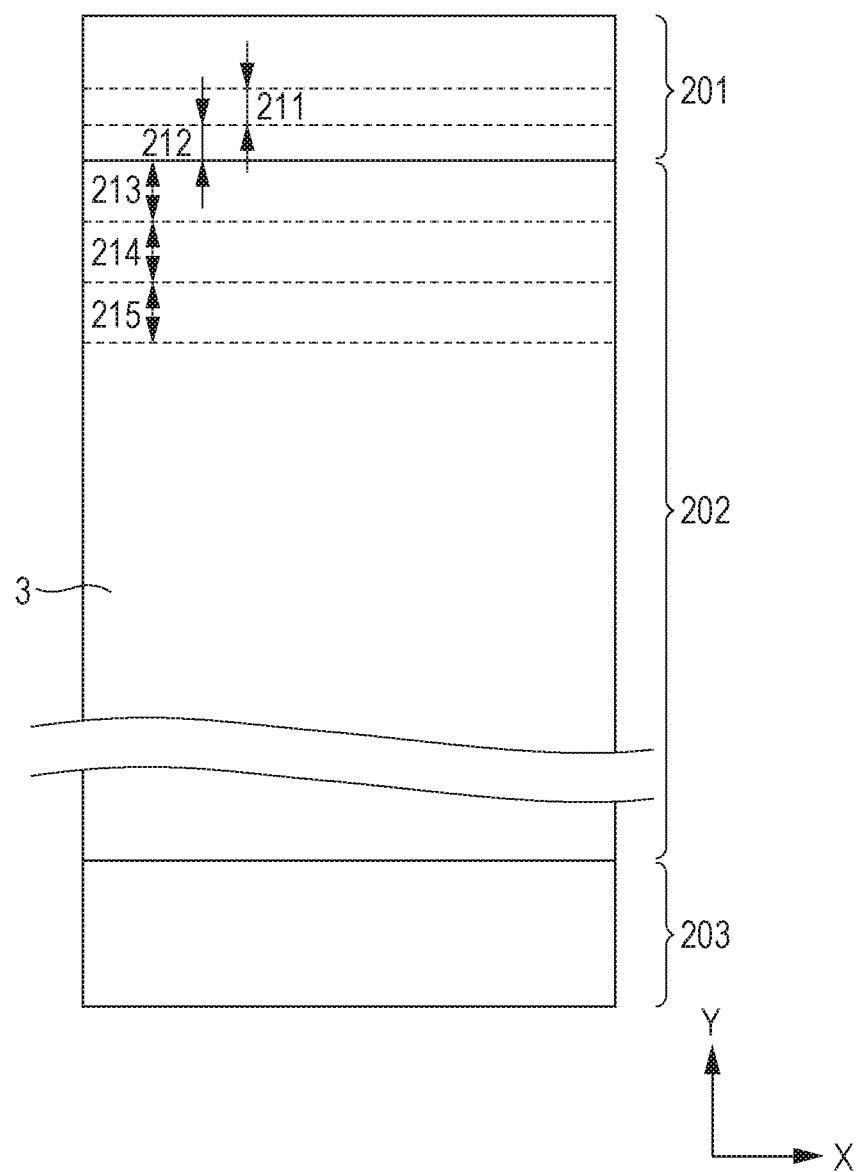
FIG. 5 is an explanatory diagram for describing an area division according to an exemplary embodiment of the subject disclosure.

FIG. 5 is an explanatory diagram for describing the area division on the recording medium 3 according to the present exemplary embodiment.

According to the present exemplary embodiment, the division is performed into three areas including a leading end area 201, a central area 202, and a trailing end area 203 on the recording medium 3. Herein, the leading end area 201 is an area where the nipping by the discharging roller pair is not performed, and the conveyance misalignment is likely to occur as described above. The trailing end area 203 is an area where the nipping by the feeding roller pair is not performed at the time of the recording, and the conveyance misalignment is likely to occur similarly as in the leading end area 201. On the other hand, the central area 202 is an area where the recording medium can be nipped by both the discharging roller pair and the feeding roller pair, and the conveyance misalignment therefore hardly occurs.

It should be noted that, according to the present exemplary embodiment, while a plurality of conveyance operations are involved for recording the respective unit areas on the recording medium, the unit areas where the conveyance misalignment is likely to occur in at least one conveyance operation among the plurality of conveyance operations, that is, where the nipping is performed by only one of the conveyance roller pairs, are included in the leading end area 201 and the trailing end area 203. For example, since the leading end part of the recording medium 3 does not reach the discharging roller pair and the nipping is performed by only the feeding roller pair immediately before the first scanning operation in a unit area 212 in the leading end area 201, the conveyance misalignment is likely to occur. However, since the leading end part of the recording medium 3 reaches the discharging roller pair when the conveyance of the recording medium 3 is performed and the first scanning operation with respect to the unit area 212 is performed, the conveyance misalignment hardly occurs thereafter. According to the present exemplary embodiment, even the above-described unit area is also included in the leading end area 201.

In view of the above, according to the present exemplary embodiment, the conveyance amount when the recording is performed with respect to the leading end area 201 or the trailing end area 203 is set to be shorter than the conveyance amount when the recording is performed with respect to the central area 202 in the multipass recording method, and the influence from the above-described conveyance misalignment is reduced.

Figure 6:
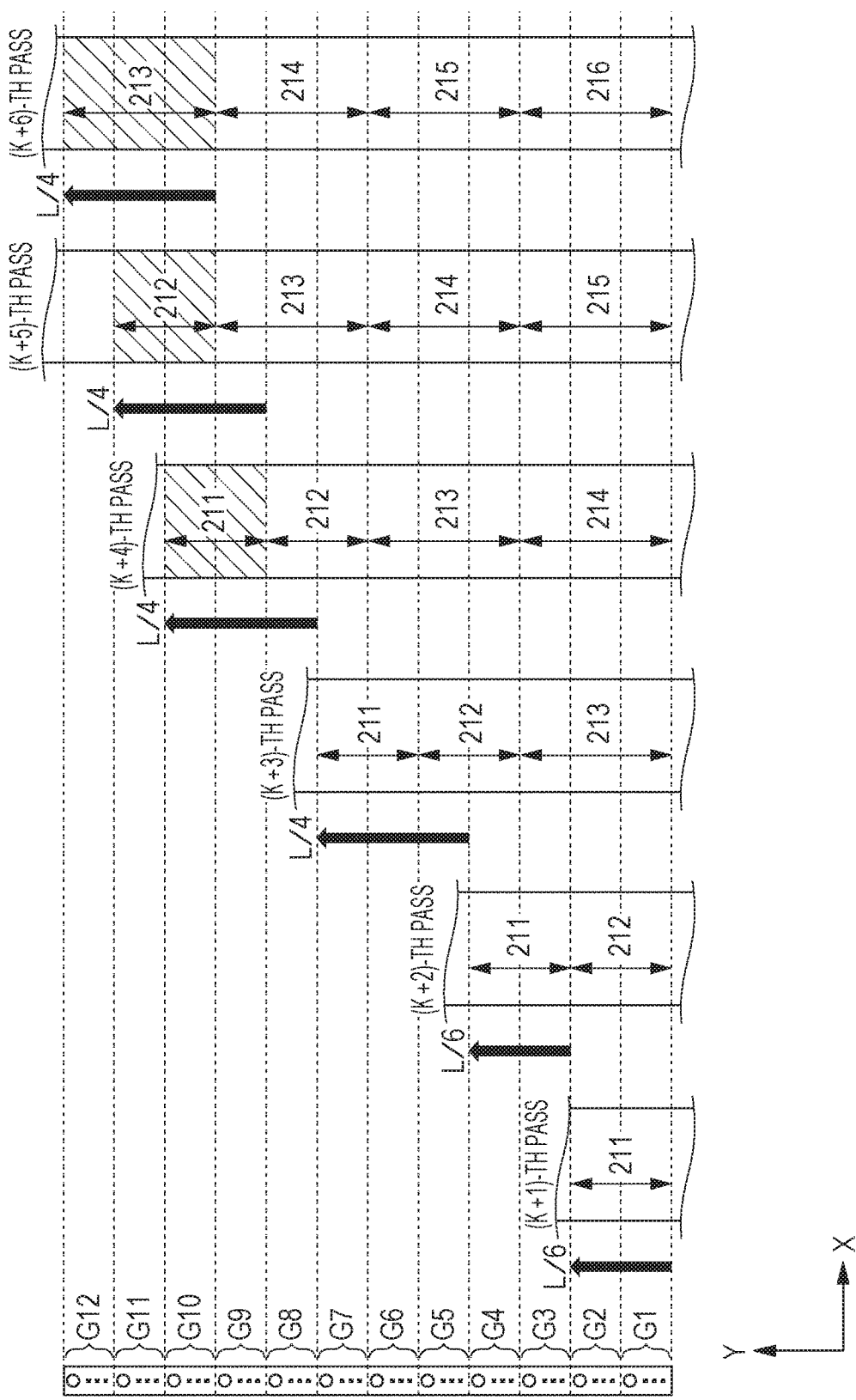
FIG. 6 is an explanatory diagram for describing a multi-pass recording method according to an exemplary embodiment of the subject disclosure.

FIG. 6 is an explanatory diagram for describing the multipass recording method executed in the present exemplary embodiment.

The respective ejection openings 30 provided in the ejection opening columns 22 for ejecting the ink are divided along the Y direction into 12 ejection opening groups G1 to G12. Herein, a length in the Y direction in each of the ejection opening groups G1 to G12 becomes L/12 in a case where a length in the Y direction of the ejection opening column 22 is set as L. It should be noted that the ejection opening column 22 includes the 768 ejection openings 30 as illustrated in FIG. 3. Therefore, 64 (=768/12) ejection openings belong to the single ejection opening group.

First, after a K-th recording scanning operation (K pass) which is not illustrated in the drawing is ended, the recording medium 3 is conveyed relatively with respect to the recording head 7 by a distance of L/6 (=L/12×2) corresponding to a width of two ejection port groups on the +Y direction side, and the unit area 211 is located so as to face the recording head 7. Since the ejection opening column 22 has a length equivalent to 768 pixels in the Y direction, this conveyance amount (first conveyance amount) is equivalent to 128 (=768/6) pixels.

Next, in the (K+1)-th recording scanning operation ((K+ 1)-th pass), the ink is ejected from the ejection opening groups G1 and G2 with respect to the unit area 211 on the recording medium 3. Then, the recording medium 3 is conveyed relatively with respect to the recording head 7 by the distance of L/6. It should be noted that, after this conveyance operation is performed, the leading end part of the recording medium 3 is nipped by the discharging roller pair as described above.

Next, in the (K+2)-th recording scanning operation ((K+ 2)-th pass), the ink is ejected from the ejection opening groups G3 and G4 with respect to the unit area 211 on the recording medium 3, and the ink is ejected from the ejection opening groups G1 and G2 with respect to the unit area 212. In this stage, the nipping of the recording medium is already performed by the two conveyance roller pairs. Therefore, after the (K+2)-th pass is ended, the recording medium is conveyed relatively by a distance of L/4 (=L/12×3) corresponding to a width of three ejection opening groups. This conveyance amount (second conveyance amount) is equivalent to 192 pixels.

Hereinafter, until reaching the trailing end area 203, the recording scanning operation of the recording head 7 and the conveyance operation of the recording medium 3 by the distance of L/4 are alternately repeated to complete the recording with respect to the leading end area 201 and the central area 202. It should be noted that the operation after reaching the trailing end area 203 is omitted, but similarly as in the leading end area 201, the conveyance distance between the scanning operations is set as L/6 in a case where the nipping by the feeding roller pair is not performed.

As a result, the ink is ejected to each unit area on the recording medium by the four scanning operations of the recording head. For example, with respect to the unit area 211, the ink is ejected from the ejection opening groups G1 and G2 in the (K+1)-th pass, the ink is ejected from the ejection opening groups G3 and G4 in the (K+2)-th pass, the ink is ejected from the ejection opening groups G6 and G7 in the (K+3)-th pass, and finally, the ink is ejected from the ejection opening groups G9 and G10 in the (K+4)-th pass to complete the recording. With respect to a unit area 212, the ink is ejected from the ejection opening groups G1 and G2 in the (K+2)-th pass, the ink is ejected from the ejection opening groups G4 and G5 in the (K+3)-th pass, the ink is ejected from the ejection opening groups G7 and G8 in the (K+4)-th pass, and finally, the ink is ejected from the ejection opening groups G10 and G11 in the (K+5)-th pass to complete the recording. With respect to a unit area 213, the ink is ejected from the ejection opening groups G1 to G3 in the (K+3)-th pass, the ink is ejected from the ejection opening groups G4 to G6 in the (K+4)-th pass, the ink is ejected from the ejection opening groups G7 to G9 in the (K+5)-th pass, and finally, the ink is ejected from the ejection opening groups G10 to G12 in the (K+6)-th pass to complete the recording.

It should be noted that the case where the recording is carried out by performing the scanning operation four times has been described herein, but the recording can be performed by a similar process even in a case where the recording is carried out by performing the scanning operation the other number of times.

Data Processing Process

Figure 7:
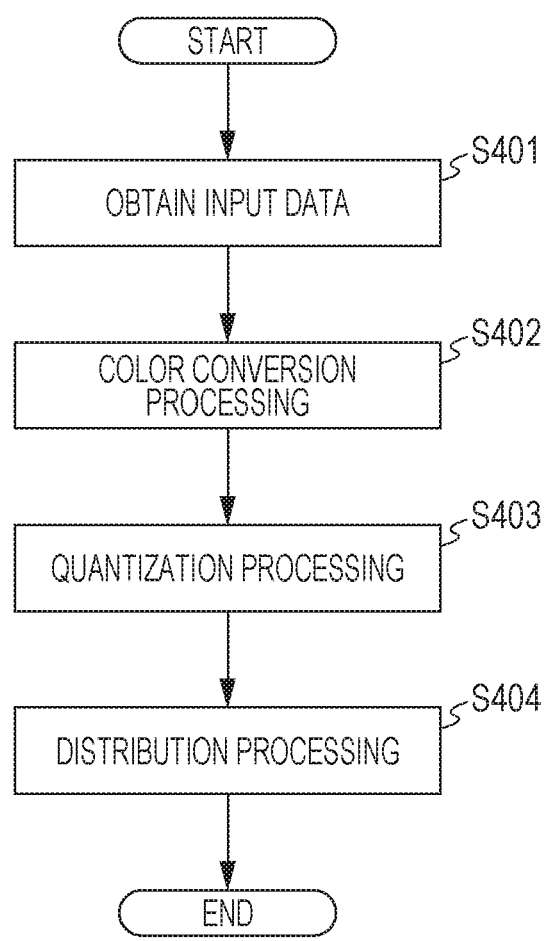
FIG. 7 illustrates a data processing procedure according to an exemplary embodiment of the subject disclosure.

FIG. 7 is a flow chart of recording data generation processing used for the recording executed by the CPU 301 in accordance with a control program according to the present exemplary embodiment.

First, in step S401, an inkjet recording apparatus 100 obtains input data in an RGB format input from the PC 312 functioning as the host computer.

Next, in step S402, color conversion processing is performed on the input data in the RGB format to be converted into multi-value data corresponding to colors of the ink used for the recording. The multi-value data represented by 8-bit 256-value information in which a grayscale is set in each of pixel groups constituted by a plurality of pixels is generated by this color conversion processing.

Next, in step S403, quantization processing for quantizing the multi-value data is performed by using a quantization pattern that will be described below. Quantized data represented by 1-bit 2-value information that specifies ejection or non-ejection of the ink to each pixel is generated by this quantization processing.

Subsequently, in step S404, distribution processing of distributing the quantized data to a plurality of scanning operations is performed by using a mask pattern that will be described below. Recording data represented by 1-bit 2-value information that specifies ejection or non-ejection of the ink to each pixel in each of the plurality of scanning operations is generated by this distribution processing.

It should be noted herein that the mode has been described in which all the processings in S401 to S404 are executed by the CPU 301 in the recording apparatus 100, but the execution can also be performed in other modes. For example, a mode may be adopted in which all the processings in S401 to S404 are executed by the PC 312. In addition, for example, a mode may be adopted in which the processings up to the quantization processing (S403) are executed by the PC 312, and the distribution processing (S404) is executed by the recording apparatus 100.

Detail of the Quantization Processing

Figure 8A:
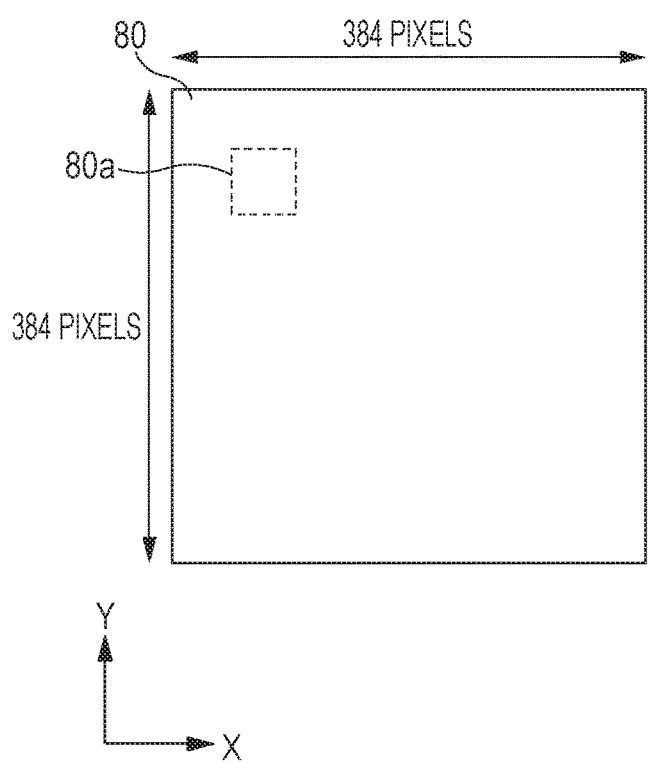
FIGS. 8A and 8B are schematic diagrams illustrating a dither pattern according to an exemplary embodiment of the subject disclosure.
Figure 8B:
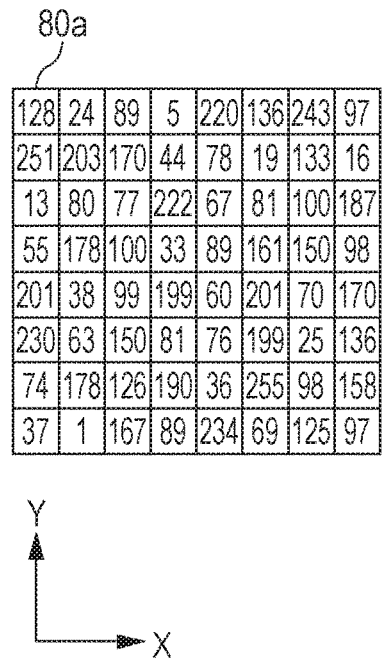

FIG. 8A is a schematic diagram of the quantization pattern 80 used in the quantization processing according to the present exemplary embodiment. FIG. 8B is an expanded view illustrating an area 80a in the quantization pattern in illustrated in FIG. 8A. It should be noted that, according to the present exemplary embodiment, a dither pattern in which a threshold is set for specifying ejection or non-ejection of the ink to each of the plurality of pixels is used as the quantization pattern.

As illustrated in FIG. 8A, the dither pattern 80 used in the present exemplary embodiment has the size of 384 pixels in the X direction and 384 pixels in the Y direction. A size in the Y direction of the dither pattern 80 is the same as the length in the Y direction of the unit area in the central area. With respect to each of these 384 pixels×384 pixels, one of 255 values from 1 to 255 is set as a threshold for the pixel as illustrated in the expanded view of FIG. 8B.

In the quantization processing in step S403 according to the present exemplary embodiment, a grayscale value indicated by the multi-value data at a certain pixel is compared with a threshold indicated by the dither pattern 80 in the corresponding pixel. The quantized data is generated in a manner that the ink ejection to the pixel is specified in a case where the grayscale value is higher than or equal to the threshold, and the ink non-ejection to the pixel is specified in a case where the grayscale value is lower than the threshold.

Herein, the thresholds are set with respect to 384×384 pixels in the dither pattern illustrated in FIGS. 8A and 8B such that the ejection amount of the ink in 256 stages in accordance with 256 grayscale values from 0 to 255 indicated by the multi-value data can be reproduced.

For example, in a case where the multi-value data having a gray scale value of 64 (=256/4) is input to all of the 384×384 pixels corresponding to the quantization pattern 80, the respective thresholds are set to generate the quantized data that specifies the ink ejection to approximately 36864 (=384×384/4) pixels. That is, the dither pattern 80 illustrated in FIG. 8A is determined such that the number of pixels where the threshold lower than or equal to 64 is set becomes approximately 36864.

For example, in a case where the multi-value data having a gray scale value of 128 (=256/2) is input to all of the 384×384 corresponding to the quantization pattern 80, the respective thresholds are set to generate the quantized data that specifies the ink ejection to approximately 73728 (=384×384/2) pixels. That is, the dither pattern 80 illustrated in FIG. 8A is determined such that the number of pixels where the threshold lower than or equal to 128 becomes approximately 73728.

In other words, the dither pattern 80 is determined such that the numbers of pixels in which the respective thresholds 1 to 255 are set in the dither pattern 80 are substantially mutually the same among the pixels.

It should be noted that the above-described dither pattern is an example of the dither patterns to which the present exemplary embodiment can be applied, and a different dither pattern can also be appropriately set in view of other elements.

Detail of the Distribution Processing

FIG. 9A1 is a schematic diagram illustrating a mask pattern 81 corresponding to the first scanning operation with respect to the unit area used in the distribution processing according to the present exemplary embodiment. FIG. 9A2 is an expanded view illustrating a certain area 81a in the mask pattern 81.

FIG. 9B1 is a schematic diagram illustrating a mask pattern 82 corresponding to the second scanning operation with respect to the unit area used in the distribution processing according to the present exemplary embodiment. FIG. 9B2 is an expanded view illustrating a certain area 82a in the mask pattern 82.

FIG. 9C1 is a schematic diagram illustrating a mask pattern 83 corresponding to the third scanning operation with respect to the unit area used in the distribution processing according to the present exemplary embodiment. FIG. 9C2 is an expanded view illustrating a certain area 83a in the mask pattern 83.

FIG. 9D1 is a schematic diagram illustrating a mask pattern 84 corresponding to the fourth scanning operation with respect to the unit area used in the distribution processing according to the present exemplary embodiment. FIG. 9D2 is an expanded view illustrating a certain area 84a in the mask pattern 84.

As illustrated in FIGS. 9A1, 9B1, 9C1, and 9D1, the mask patterns 81 to 84 used in the present exemplary embodiment each have a size of 384 pixels in the X direction and 384 pixels in the Y direction. This is the same size as that of the dither pattern 80 used in the present exemplary embodiment. As illustrated in the expanded views of FIGS. 9A2, 9B2, 9C2, and 9D2, permission or prohibition of the recording to the pixel is specified for each of these 384×384 pixels. It should be noted that, in FIGS. 9A2, 9B2, 9C2, and 9D2, a blackened pixel represents a recording permission pixel where the ejection of the ink is permitted, and a void pixel represents a recording prohibition pixel where the ejection of the ink is not permitted.

In the distribution processing in step S404 according to the present exemplary embodiment, recording data is generated on the basis of the ejection/non-ejection of the ink specified by the quantized data of a certain pixel and the permission/prohibition of the ink ejection respectively specified by the mask patterns 81 to 84 in the corresponding pixel. More specifically, in a case where the quantized data at the certain pixel specifies the ejection of the ink, and also the mask pattern specifies the permission of the ink ejection, the recording data is generated such that the ink is ejected to the pixel in the scanning corresponding to the mask pattern. On the other hand, in a case where the quantized data at the certain pixel specifies the ejection of the ink, and also the mask pattern specifies the prohibition of the ink ejection, the recording data is generated such that the ink is not ejected to the pixel in the scanning corresponding to the mask pattern. In a case where the quantized data at the certain pixel specifies the non-ejection of the ink, the recording data is generated such that the ink is not ejected irrespective of the permission/prohibition of the ink ejection specified by the mask pattern.

Herein, the recording permission pixels are arranged at mutually complementary and exclusive positions in the mask patterns 81 to 84 illustrated in FIGS. 9A1, 9A2, 9B1, 9B2, 9C1, 9C2, 9D1, and 9D2. That is, with respect to the respective pixels, the permission of the ink ejection is specified in one mask pattern among the four mask patterns 81 to 84, and also, the prohibition of the ink ejection is specified in the other three mask patterns. Accordingly, for example, in a case where the quantized data that specifies the ejection of the ink is input to all of the 384×384 pixels corresponding to the mask patterns 81 to 84, the ink can be ejected to the respective pixel areas in one scanning operation among the first to fourth scanning operations.

In addition, the mask patterns 81 to 84 illustrated in FIGS. 9A1, 9A2, 9B1, 9B2, 9C1, 9C2, 9D1, and 9D2 are determined to mutually have substantially the same number of the recording permission pixels. Accordingly, for example, in a case where the quantized data that specifies the ejection of the ink is input to all of the 384×384 pixels corresponding to the mask patterns 81 to 84, the number of times to perform the ink ejection in each of the first to fourth scanning operations can be set as substantially the same.

From the above-described configuration, it may be understood that a recording permission ratio defined by a ratio of the number of the recording permission pixels with respect to a sum of the number of the recording permission pixels and the number of the recording prohibition pixels is all set as 25% in each of the mask patterns 81 to 84 illustrated in FIGS. 9A1, 9A2, 9B1, 9B2, 9C1, 9C2, 9D1, and 9D2.

It should be noted that the above-described mask pattern is an example of mask patterns to which the present exemplary embodiment can be applied, and a different mask pattern can be appropriately set by taking other elements into account.

Synchronization of the Dither Pattern and the Mask Pattern

The dither pattern 80 and each of the mask patterns 81 to 84 used in the present exemplary embodiment are determined while being associated with each other. It should be noted that, in the following explanation, the determination of the arrangement of the pixels in which the respective thresholds of the dither pattern are set and the arrangement of the recording permission pixels of the mask pattern while being associated with each other will be also referred to as synchronization of the dither pattern and the mask pattern.

More specifically, according to the present exemplary embodiment, in a case where the multi-value data that specifies a grayscale value of 64 (=256×0.25) corresponding to a grayscale value of 25% is quantized by using the dither pattern 80, and the generated quantized data is distributed to the first scanning operation by using the mask pattern 81, the dither pattern 80 and the mask pattern 81 are determined while being associated with each other such that the dispersibility of the pixels where the ejection of the ink is specified by the generated recording data corresponding to the first scanning operation is set to be high to some extent. That is, the dither pattern 80 and the mask pattern 81 are determined as follows. The recording data indicating the image in which the pixels where the ejection of the ink is specified as illustrated in FIG. 1C1 spatially evenly exist can be generated instead of the recording data indicating the image having a conspicuous spatial deviation of the pixels where the ejection of the ink is specified as illustrated in FIG. 1B1.

Furthermore, according to the present exemplary embodiment, similarly in a case where the multi-value data that specifies a grayscale value of 128 (=256×0.5) corresponding to a grayscale value of 50% is input, a case where the multi-value data that specifies a grayscale value of 192 (=256×0.75) corresponding to a grayscale value of 75% is input, and a case where the multi-value data that specifies a grayscale value of 256 (=256×1) corresponding to a grayscale value of 100% is input, the dither pattern 80 and the mask pattern 81 are determined while being associated with each other such that the dispersibility of the pixels where the ejection of the ink is specified by the generated recording data corresponding to the first scanning operation is set to be high to some extent.

Herein, as an evaluation of the dispersibility, the dither pattern 80 and the mask pattern 81 are preferably determined in a manner that an arrangement of the dots based on the recording data does not exhibit white noise characteristics. The dither pattern 80 and the mask pattern 81 are more preferably determined in a manner that the arrangement of the dots based on the recording data does not exhibit red noise characteristics. Furthermore, the dither pattern 80 and the mask pattern 81 are still more preferably determined in a manner that the arrangement of the dots based on the recording data exhibits blue noise characteristics.

That is, with regard to the dither pattern 80 and the mask pattern 81, an arrangement of dots based on the generated recording data has preferably more high frequency components than low frequency components in a spatial frequency area. With this configuration, the arrangement of the dots based on the recording data can be spatially dispersed without being locally concentrated.

Herein, the case has been described where the synchronization of the dither pattern and the mask pattern constituted by 384 pixels in the X direction and 384 pixels in the Y direction is performed, but the size of each of the dither pattern and the mask pattern where the synchronization is performed may be appropriately varied. It should be noted however that the synchronization of the dither pattern and the mask pattern is preferably performed with a large size to some extent to evaluate the dispersibility, and the synchronization is preferably performed with a size of at least 10 pixels in the X direction and at least 10 pixels in the Y direction or larger.

The synchronization of the mask pattern 81 and the dither pattern 80 corresponding to the first scanning operation has been described herein, and the synchronization of the mask pattern 82 and the dither pattern 80 corresponding to the second scanning operation, the synchronization of the mask pattern 83 and the dither pattern 80 corresponding to the third scanning operation, and the synchronization of the mask pattern 84 and the dither pattern 80 corresponding to the fourth scanning operation are all similarly performed.

Therefore, the dither pattern 80 used in the present exemplary embodiment and the respective mask patterns 81 to 84 are determined while be being associated with each other in the respective grayscales at 25%, 50%, 75%, and 100%.

It should be noted that the association according to the present exemplary embodiment is performed when the data of the mask patterns is created. For example, first, the dither pattern is prepared in which thresholds to be compared with grayscale data are arranged. Subsequently, the mask patterns are determined in a manner that the pixels formed by the respective scanning operations have the above-described dispersed state when viewed from each of the respective passes alone by taking into account the thresholds of the respective pixels of this dither pattern.

Specifically, while the thresholds of the respective pixels of the dither pattern are taken into account, positions where the pixel formation to the positions in the unit area is permitted are determined in the respective scanning operations. As an alternative configuration to the above, the number of dots permitted to be formed in the respective positions is determined.

For example, a certain dither pattern is a previously determined pattern, and a dot formation pixel to a predetermined position is determined in the mask pattern corresponding to one certain scanning operation. Next, the dot formation pixels are further determined in the remaining positions, but at this time, a position where the dispersibility becomes the highest in a case where a dot is further added to the previously formed dot at the predetermined position is set as the next dot formation position. The evaluation of the dispersibility may be performed under a predetermined condition.

In addition, the dither pattern has been described as the previously determined pattern herein. However, when the thresholds of the dither pattern are sequentially determined while the mask pattern is a previously determined pattern, quantized data obtained from a logical product of the dots that may be formed in the respective grayscales and the mask pattern may be evaluated to determine the thresholds.

Storage Format of the Mask Patterns

According to the present exemplary embodiment, mask pattern parts obtained by respectively dividing the mask patterns 81 to 84 illustrated in FIGS. 9A1, 9A2, 9B1, 9B2, 9C1, 9C2, 9D1, and 9D2 which are synchronized with the dither pattern 80 in the Y direction into two parts and stored in the ROM 302.

Figure 10:
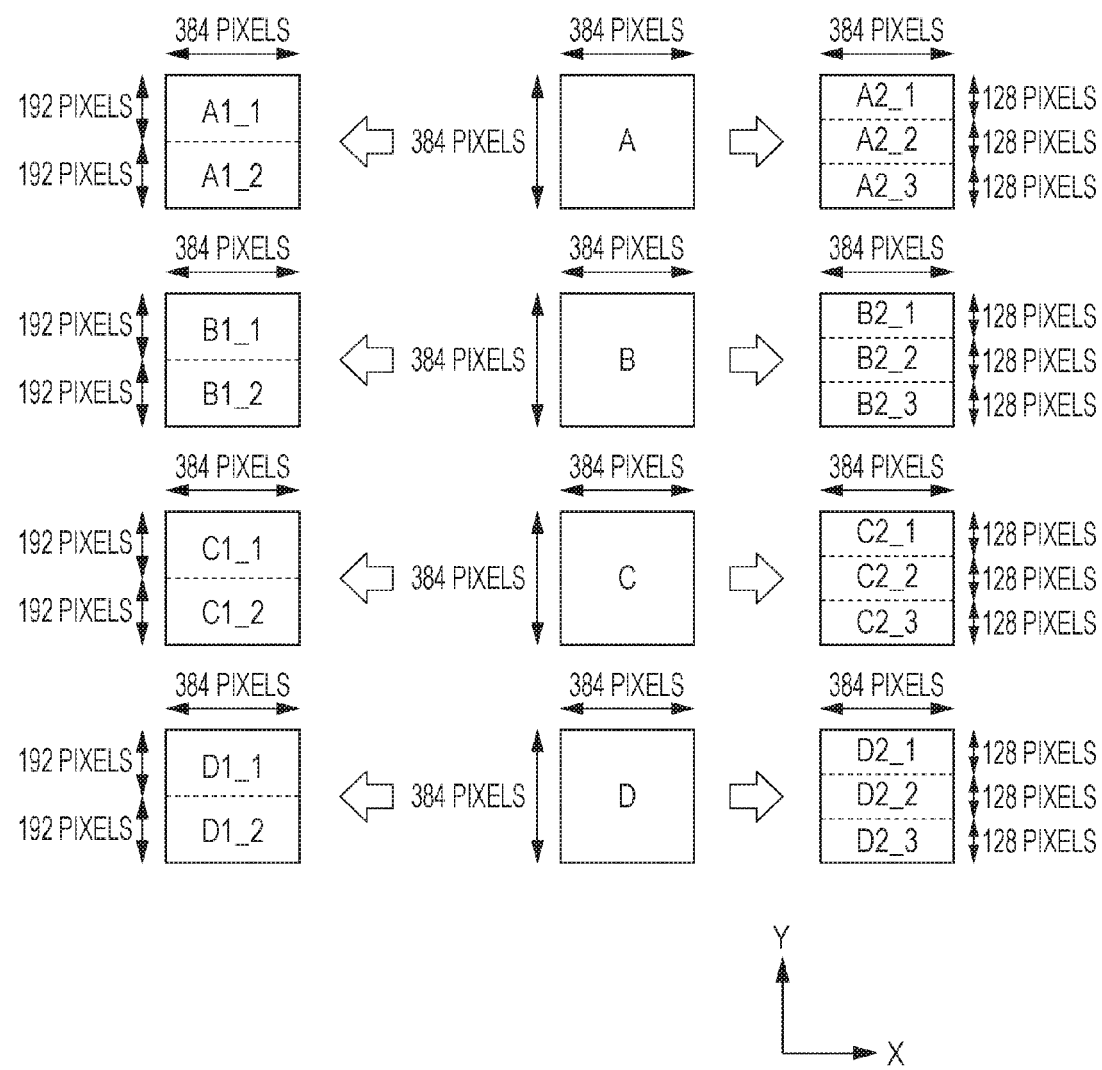
FIG. 10 is a schematic diagram illustrating mask pattern parts according to an exemplary embodiment of the subject disclosure.

FIG. 10 is an explanatory diagram for describing the mask pattern parts according to the present exemplary embodiment. It should be noted that, for simplicity in the following explanation, the mask patterns 81, 82, 83, and 84 will be respectively referred to as mask patterns A, B, C, and D.

First, according to the present exemplary embodiment, the mask patterns A to D illustrated in FIGS. 9A1, 9A2, 9B1, 9B2, 9C1, 9C2, 9D1, and 9D2 are respectively divided in the Y direction into two parts to obtain mask pattern parts A1_1 to D1_1 and A1_2 to D1_2.

For example, the mask pattern A corresponding to the first scanning operation is divided into the mask pattern part A1_1 corresponding to the +Y direction side and having a size of 384 pixels in the X direction and 192 pixels in the Y direction and the mask pattern parts A1_2 corresponding to the −Y direction side and having a size of 384 pixels in the X direction and 192 pixels in the Y direction.

Similarly, the mask patterns B, C, and D corresponding to the second, third, and fourth scanning operations are respectively divided into two parts including mask pattern parts B1_1, C1_1, and D1_1 corresponding to the +Y direction side and having a size of 384 pixels in the X direction and 192 pixels in the Y direction and the mask pattern parts B1_2, C1_2, and D1_2 corresponding to the −Y direction side and having a size of 384 pixels in the X direction and 192 pixels in the Y direction.

Furthermore, according to the present exemplary embodiment, the respective mask patterns A to D illustrated in FIGS. 9A1, 9A2, 9B1, 9B2, 9C1, 9C2, 9D1, and 9D2 are divided in the Y direction into three parts to obtain the mask pattern parts A2_1 to D2_1, A2_2 to D2_2, and A2_3 to D2_3.

For example, the mask pattern A corresponding to the first scanning operation is divided into the mask pattern parts A2_1 corresponding to the +Y direction side and having the size of 384 pixels in the X direction and 128 pixels in the Y direction, the mask pattern parts A2_2 corresponding to a central side in the Y direction and having the size of 384 pixels in the X direction and 128 pixels in the Y direction, and the mask pattern parts A2_3 corresponding to the −Y direction side and having the size of 384 pixels in the X direction and 128 pixels in the Y direction.

Similarly, the mask patterns B, C, and D corresponding to the second, third, and fourth scanning operations are respectively divided into the three parts including the mask pattern parts B2_1, C2_1, and D2_1 corresponding to the +Y direction side, the mask pattern parts B2_2, C2_2, and D2_2 corresponding to the central side in the Y direction, and the mask pattern parts B2_3, C2_3, and D2_3 corresponding to the −Y direction side, which all have the size of 384 pixels in the X direction and 128 pixels in the Y direction.

It should be noted that the mask patterns A to D are determined such that the above-described recording permission ratios in the respective mask pattern parts are all set as approximately 25%. In other words, the mask patterns A to D are determined to have the recording permission ratio of approximately 25% irrespective of the position in the Y direction.

Herein, the mask pattern parts A1_1, B1_1, C1_1, and D1_1 are areas set by being synchronized with the area of 192 pixels in the Y direction located on the +Y direction side in a dither pattern Q (hereinafter, for simplicity, the dither pattern 80 will be also referred to as a dither pattern Q).

Therefore, when the distribution processing is performed by using the mask pattern parts A1_1, B1_1, C1_1, and D1_1 with respect to the quantized data that is quantized by the area having 192 pixels in the Y direction located on the +Y direction side of the dither pattern Q in the quantized data, it is possible to generate the recording data having the high dispersibility of the pixels in which the ejection of the ink is specified.

On the other hand, when the distribution processing is performed by using other mask pattern parts such as, for example, the mask pattern parts A1_2, B1_2, C1_2, and D1_2, with respect to the quantized data that is quantized by the area having 192 pixels in the Y direction located on the +Y direction side of the dither pattern Q in the quantized data, since the synchronization of the mask pattern and the dither pattern is not performed, the recording data may be generated in which the pixels in which the ejection of the ink is specified are spatially unevenly placed.

Herein, the synchronization of the mask pattern parts A1_1, B1_1, C1_1, and D1_1 with the areas located on the +Y direction side in the dither pattern Q has been described, but the same also applies to the other mask pattern parts.

According to the present exemplary embodiment, the above-described mask pattern parts A1_1 to D1_1, A1_2 to D1_2, A2_1 to D2_1, A2_2 to D2_2, and A2_3 to D2_3 are stored in the ROM 302, and the respective mask pattern parts are adopted as will be described below.

Application Method of the Dither Pattern and the Mask Pattern

According to the present exemplary embodiment, the recording is performed in accordance with the recording data generated by using the dither pattern illustrated in FIGS. 8A and 8B and the mask pattern parts illustrated in FIG. 10 in the multipass recording method illustrated in FIG. 6.

Figure 11:
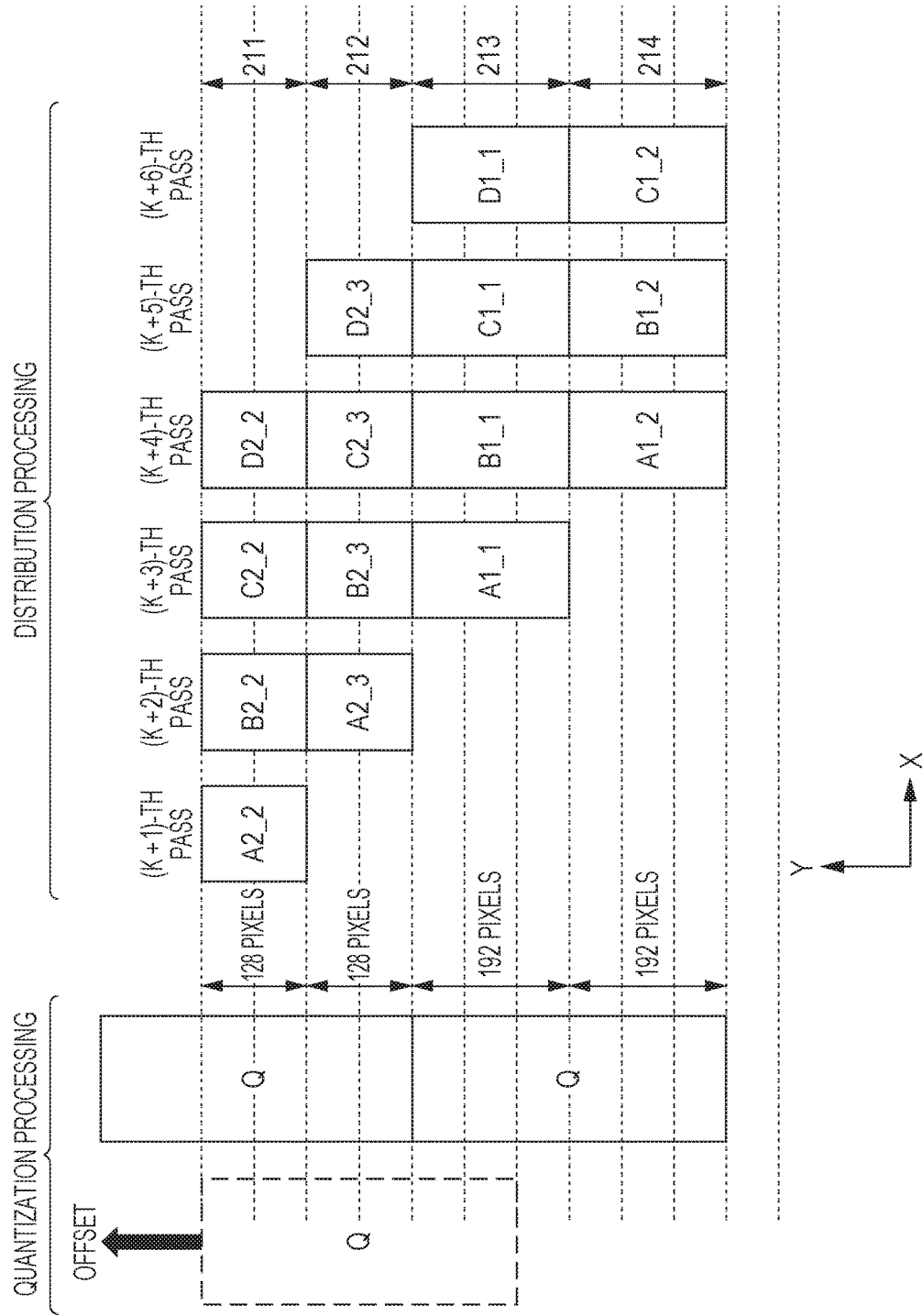
FIG. 11 is an explanatory diagram for describing a detail of quantization processing and distribution processing according to an exemplary embodiment of the subject disclosure.

FIG. 11 is a schematic diagram of the application method of the dither pattern and the mask pattern performed by the CPU 301 according to the present exemplary embodiment.

According to the present exemplary embodiment, offset of the dither pattern is performed in the quantization processing in S403.

As described with reference to FIG. 5 and FIG. 6, according to the present exemplary embodiment, until the (K+2)-th pass is performed at which the recording is started in the unit area 212 in the leading end area, the conveyance misalignment is likely to occur because the nipping by the discharging roller pair is not performed. For this reason, as illustrated in FIG. 5 and FIG. 6, the conveyance amount is set to be smaller until the (K+2)-th pass is performed than the conveyance amount after the (K+2)-th pass is performed. As a result, the unit areas 211 and 212 in the leading end area where the recording is performed at least once at a time when the (K+2)-th pass is performed have the shorter length in the Y direction than the length of the unit areas 213, 214, and 215 in the central area where the recording is performed for the first time after the (K+2)-th pass is performed.

In this manner, when the lengths in the Y direction of the unit areas in the leading end area and the central area are different from each other, as illustrated in first and second comparison modes which will be described below, the recording time needs to be extended, or the synchronization of the mask pattern and the dither pattern needs to be abandoned.

In view of the above, according to the present exemplary embodiment, offset in the Y direction of the dither pattern is performed in the quantization processing in S403, and the position is determined such that the multi-value data corresponding to the unit area 212 at a boundary between the leading end area and the central area corresponds to the end part on the −Y direction side of the dither pattern Q.

Herein, in a case where the end part on the +Y direction side of the dither pattern Q and the end part on the +Y direction side of the recording medium 3 are matched with each other, and the dither pattern Q is thereafter repeatedly adopted along the Y direction, an area in the dither pattern to be applied to the unit area 212 varies depending on the size of the recording medium or the recording image.

For example, as indicated by a broken line of FIG. 11, the central part in the Y direction of the dither pattern Q corresponds to the multi-value data corresponding to the unit area 212 in some cases. According to the present exemplary embodiment, the offset of the dither pattern Q is performed in the above-described case, and as indicated by a solid line of FIG. 11 (dither pattern Q on the top side among the two dither patterns Q indicated by the solid lines), adjustment is performed such that the end part on the −Y direction side of the dither pattern Q corresponds to the multi-value data corresponding to the unit area 212. The dither pattern Q corresponding to the unit area 212 after the offset is set as a reference, and the dither pattern Q is repeated applied to the multi-value data in the Y direction to generate the quantized data.

Next, in the distribution processing in S404, the mask pattern parts corresponding to the area in the dither pattern Q adopted at the time of the quantization processing are applied to the quantized data corresponding to each unit area, and the recording data is generated in each unit area.

For example, as illustrated in FIG. 11, the quantized data corresponding to the unit area 211 is quantized by using the central part in the Y direction when the dither pattern Q is divided into three parts. For this reason, the mask pattern parts A2_2 to D2_2 illustrated in FIG. 10 corresponding to the central part in the Y direction of the dither pattern Q are applied to the quantized data corresponding to the unit area 211. Since the central part in the Y direction of the dither pattern Q and the mask pattern parts A2_2 to D2_2 are mutually synchronized, it is possible to generate the recording data including the dot arrangement that has the high dispersibility.

As illustrated in FIG. 11, the quantized data corresponding to the unit area 212 is quantized by using the end part on the −Y direction side when the dither pattern Q is divided into three parts. For this reason, the mask pattern parts A2_3 to D2_3 illustrated in FIG. 10 corresponding to the end part on the −Y direction side of the dither pattern Q are applied to the quantized data corresponding to the unit area 212.

As illustrated in FIG. 11, the quantized data corresponding to the unit area 213 is quantized by using the end part on the +Y direction side when the dither pattern Q is divided into two parts. For this reason, the mask pattern parts A1_1 to D1_1 illustrated in FIG. 10 corresponding to the end part on the +Y direction side of the dither pattern Q are applied to the quantized data corresponding to the unit area 213.

According to the above-described configuration, since the mutually synchronized dither pattern and mask pattern parts are applied to each unit area, it is possible to record the image in which the spatial deviation is small in each unit area. In addition, since the conveyance amount is decreased only in a case where there is a possibility that the conveyance misalignment may occur, it is also possible to suppress the unnecessary decrease in the throughput.

First Comparison Mode

Next, a first comparison mode with respect to the present exemplary embodiment will be described in detail.

According to the first comparison mode, the offset of the dither pattern Q that is executed in the present exemplary embodiment is not performed, and also the multipass recording is performed by the conveyance amount described with reference to FIG. 6. It should be noted that, unless particularly specified, the recording is performed under a recording condition similar to that of the present exemplary embodiment described with reference to FIG. 11.

Figure 12:
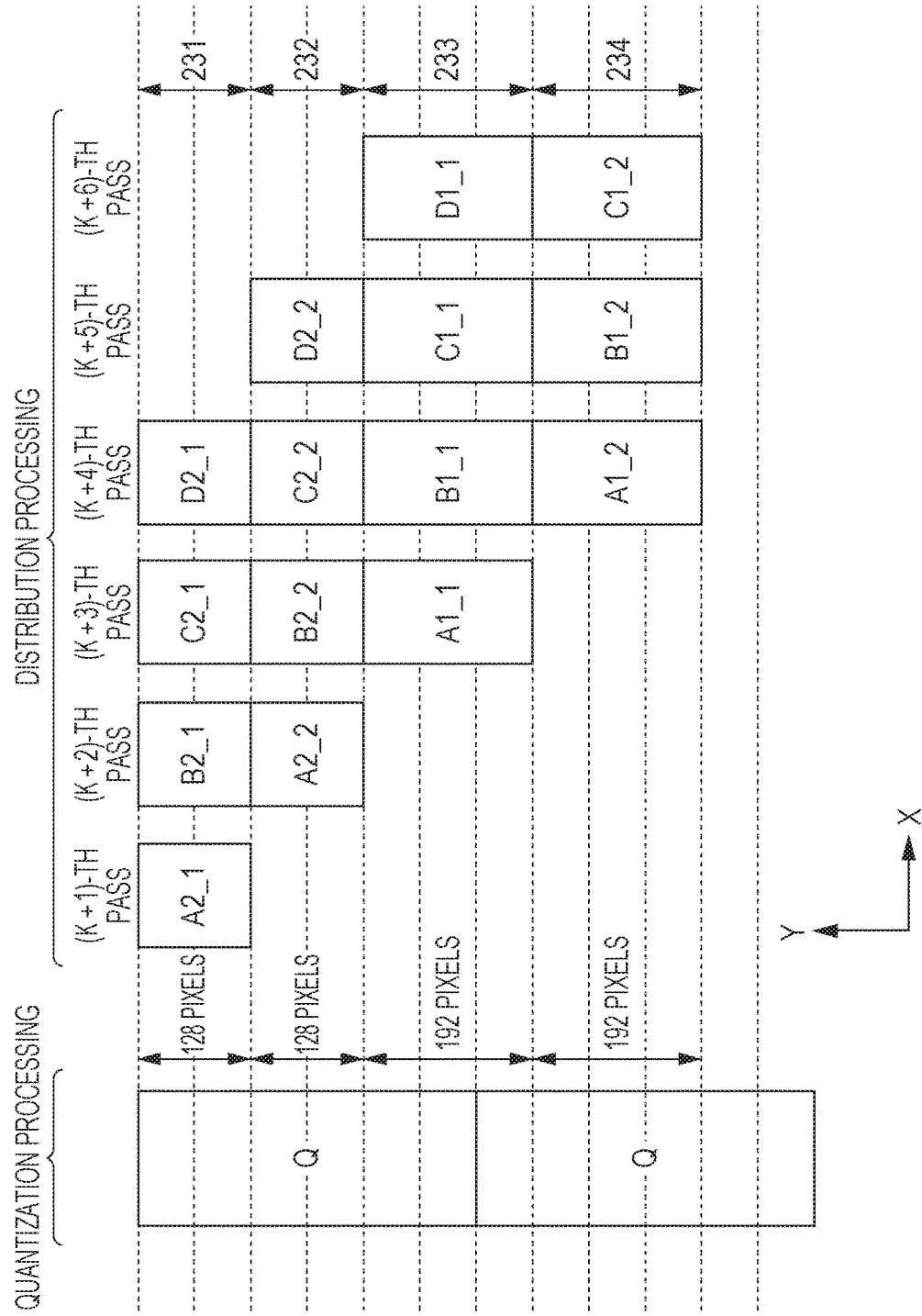
FIG. 12 is an explanatory diagram for describing a detail of the quantization processing and the distribution processing according to a comparison mode.

FIG. 12 is a schematic diagram of an adopting method of the dither pattern and the mask pattern according to the first comparison mode.

Herein, similarly as in the part indicated by the broken line of FIG. 11, the central part in the Y direction of the dither pattern Q corresponds to the multi-value data corresponding to the unit area 232 (equivalent to the unit area 212 illustrated in FIG. 11) in FIG. 12 too. It should be noted however that, unlike The present exemplary embodiment described with reference to FIG. 11, the offset of the dither pattern Q is not performed according to the first comparison mode.

For this reason, for example, the multi-value data corresponding to a unit area 231 (equivalent to the unit area 211 illustrated in FIG. 11) is quantized by using the end part on the +Y direction side in the dither pattern Q and thereafter distributed by using the corresponding mask pattern parts A2_1 to D2_1. The multi-value data corresponding to a unit area 232 (equivalent to the unit area 212 illustrated in FIG. 11) is quantized by using the central part in the Y direction in the dither pattern Q and thereafter distributed by using the corresponding mask pattern parts A2_2 to D2_2.

In this manner, the mutually synchronized dither pattern and mask pattern can be used with regard to the unit areas 231 and 232 in the first comparison mode too.

However, when the quantized data corresponding to a unit area 233 (equivalent to the unit area 213 illustrated in FIG. 11) is considered, the mask pattern parts corresponding to the area in the dither pattern Q used for the quantization do not exist. This is because the quantization is shared to be performed by the two dither patterns Q with respect to the quantized data corresponding to the unit area 233.

In contrast to this, for example, the distribution processing itself can be performed by applying the mask pattern parts A1_1 to D1_1 to the quantized data corresponding to the unit area 233. It should be noted however that the area in the quantization pattern used in the quantization and the mask pattern parts A1_1 to D1_1 are not mutually synchronized. Therefore, there is a possibility that the spatial deviation may occur in the recorded image.

Second Comparison Mode

Next, a second comparison mode with respect to the present exemplary embodiment will be described in detail.

According to the second comparison mode, the offset of the dither pattern Q that is executed in the present exemplary embodiment is not performed, and also the recording is performed by regularly using the mutually synchronized dither pattern and mask pattern. It should be noted that, unless particularly specified, the recording is performed under a recording condition similar to those of the present exemplary embodiment described with reference to FIG. 11 and the first comparison mode described with reference to FIG. 12.

Figure 13:
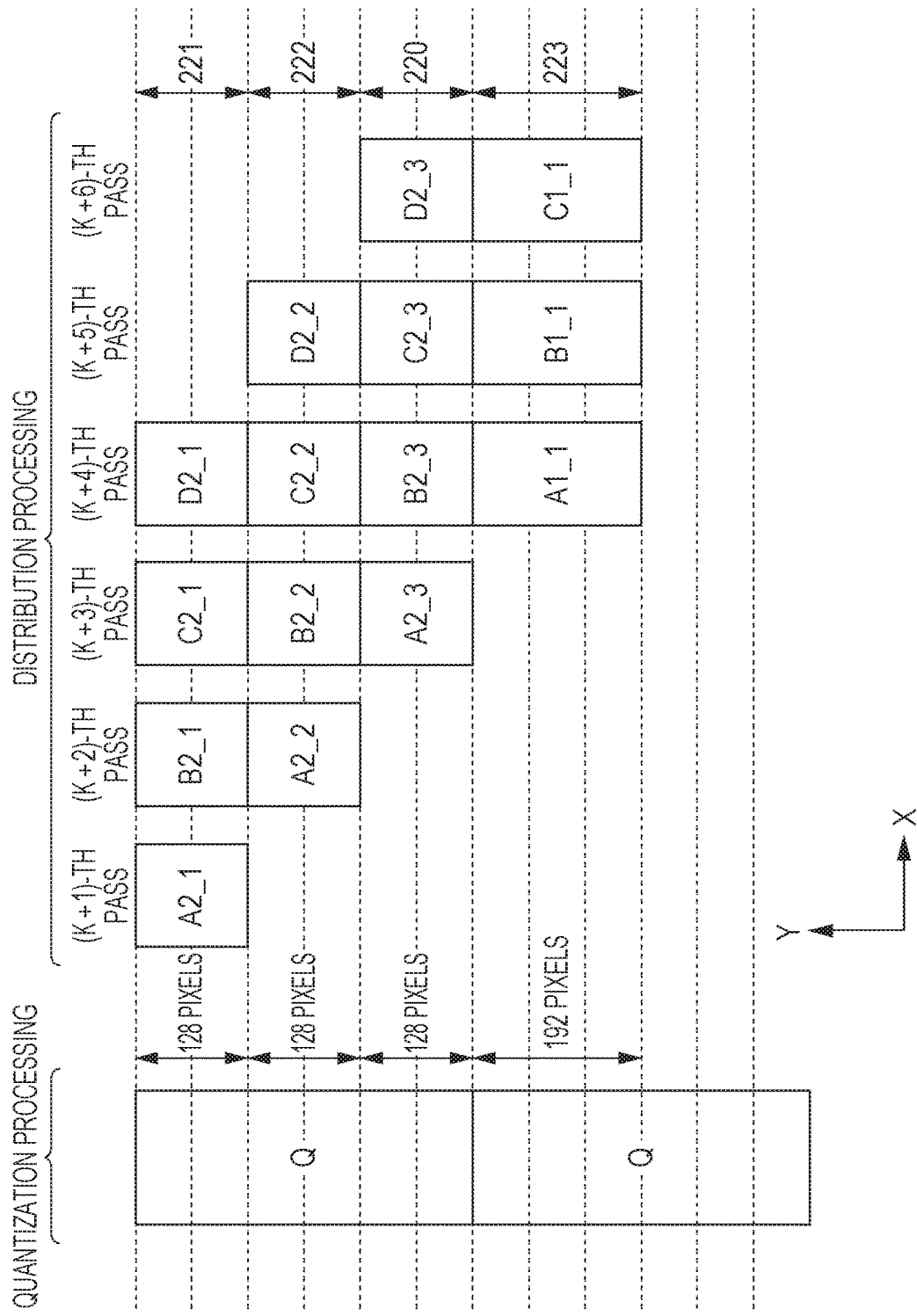
FIG. 13 is an explanatory diagram for describing a detail of the quantization processing and the distribution processing according to a comparison mode.

FIG. 13 is a schematic diagram of an adopting method of the dither pattern and the mask pattern according to the second comparison mode.

Similarly as in the part indicated by the broken line of FIG. 11, in FIG. 13 too, the central part in the Y direction of the dither pattern Q corresponds to the multi-value data corresponding to a unit area 222 (equivalent to the unit area 212 illustrated in FIG. 11). It should be noted however that the offset of the dither pattern Q is also performed in the second comparison mode too.

For this reason, for example, the multi-value data corresponding to a unit area 221 (equivalent to the unit area 211 illustrated in FIG. 11) is quantized by using the end part on the +Y direction side in the dither pattern Q and thereafter distributed by using the corresponding mask pattern parts A2_1 to D2_1. The multi-value data corresponding to the unit area 222 (equivalent to the unit area 212 illustrated in FIG. 11) is quantized by using the central part in the Y direction in the dither pattern Q and thereafter distributed by using the corresponding to mask pattern parts A2_2 to D2_2. Up this point, the operation is similar to that of the first comparison mode.

Herein, according to the second comparison mode, another unit area 220 having a size of 128 pixels in the Y direction is inserted between the unit area 222 (equivalent to the unit area 212 illustrated in FIG. 11) and a unit area 223 (unit area 213 illustrated in FIG. 11). Then, the end part on the −Y direction side the dither pattern Q corresponding to the remaining area of the dither pattern Q used for the quantization with respect to the multi-value data corresponding to the unit areas 221 and 222 is used to quantize the multi-value data corresponding to the newly inserted unit area 220 described above. Furthermore, when the distribution processing is performed by adopting the mask pattern parts A2_3 to D2_3 corresponding to the end part on the −Y direction side of the dither pattern Q, the recording can be performed by using the mutually synchronized dither pattern and mask pattern with regard to the unit area 220 too.

Then, the dither pattern and the mask pattern part can be applied to the unit area 223 (equivalent to the unit area 213 illustrated in FIG. 11) and subsequent areas similarly as in the present exemplary embodiment. For this reason, according to the second comparison mode, it is possible to record the image in which the spatial deviation is small over the entire area of the recording medium.

However, according to the second comparison mode, although the influence of the conveyance misalignment can be originally sufficiently reduced if the conveyance is performed by the short conveyance amount of 128 pixels up to the unit area 222 (equivalent to the unit area 212 illustrated in FIG. 11), the number of times to perform the conveyance operation by the short conveyance amount is increased by one since the unit area 220 is inserted. For this reason, it takes a longer time to complete the recording with respect to the recording medium according to the second comparison mode as compared with the present exemplary embodiment, which leads to the decrease in the throughput.

As described above, the spatial deviation of the recording image occurs according to the first comparison mode, and there is a possibility that the decrease in the throughput may occur according to the second comparison mode.

In contrast to this, when the dither patter is offset as in the present exemplary embodiment, it is possible to perform the recording in which the decrease in the throughput is also suppressed while the spatial deviation of the recording image is suppressed.

Second Exemplary Embodiment

According to the first exemplary embodiment, the mode has been described in which the multi-value data is converted into binary data represented by 1-bit 2-value information in the quantization processing, and the binary data is distributed in the distribution processing to a plurality of scanning operations to generate the binary recording data.

In contrast to this, according to the present exemplary embodiment, a mode will be described in which the quantized data is converted into M-value data represented by n-bit (n≥2) M-value (M≥3) information, and the M-value data is distributed in the distribution processing to the plurality of scanning operations to generate the binary recording data.

It should be noted that descriptions on components similar to those according to the above-described first exemplary embodiment will be omitted.

According to the present exemplary embodiment, the quantization processing S403 and the distribution processing S404 illustrated in FIG. 7 are varied from those according to the first exemplary embodiment.

It should be noted that, as an example of n-bit M-value data herein, quantized data represented by the 2-bit 4-value information ("00", "01", "10", "11") is generated in the quantization processing. Herein, the 2-bit 4-value information of the quantized data specifies the number of times to perform the ink ejection to the pixel. More specifically, in a case where the 2-bit 4-value information of the quantized data is "00", the ink is not ejected to the pixel at all. In a case where the 2-bit 4-value information of the quantized data is "01", the ink is ejected to the pixel once. In a case where the 2-bit 4-value information of the quantized data is "10", the ink is ejected to the pixel twice. In a case where the 2-bit 4-value information of the quantized data is "11", the ink is ejected to the pixel three times.

It should be noted that, for simplicity in the following explanation, the 2-bit 4-value information ("00", "01", "10", "11") indicating the number of times to perform the ink ejection will be also referred to as a pixel value.

Quantization Processing

Figure 14:
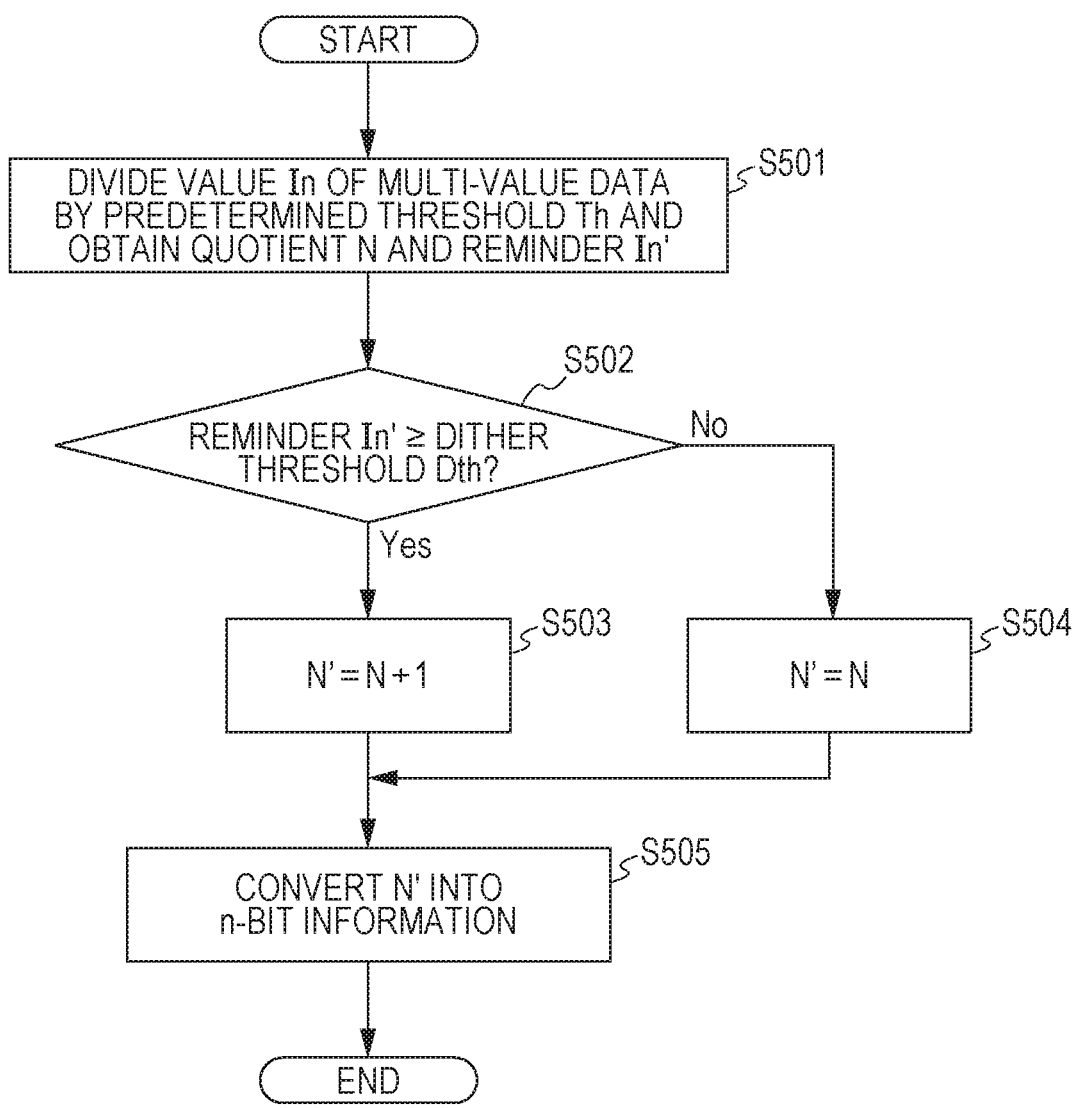
FIG. 14 illustrates a process of the quantization processing according to the exemplary embodiment.

FIG. 14 is a flow chart for the quantized data generation in the quantization processing in S403 in accordance with the control program according to the present exemplary embodiment.

When the quantization processing in S403 according to the present exemplary embodiment is started, first, in step S501, a grayscale value In indicated by the multi-value data in the respective pixels is divided by a predetermined threshold Th determined in advance to calculate a quotient N and a remainder In' thereof.

Herein, in a case where the M-value quantized data is generated in the quantization processing and also the grayscale values that can be represented by the multi-value data are L stages, the predetermined threshold Th is preferably set as a value calculated by the following Expression (1).

$$Th=(L-1)/(M-1) \qquad (1)$$

As described above, M=4 is set according to the present exemplary embodiment. Since the multi-value data can represent grayscale values in 256 stages from 0 to 255, L=256 is set. Therefore, according to the present exemplary embodiment, the predetermined threshold Th=85 (=(256−1)/(4−1)) is set.

It should be noted that the calculation method for the above-described predetermined threshold Th is an example, and the threshold Th may be appropriately set by using a different method.

FIG. 15 is a table illustrating the quotient N and the reminder In' obtained in a case where the grayscale value In of the multi-value data is one of the values 0 to 255.

As illustrated in FIG. 15, in a case where the grayscale value In of the multi-value data is one of the values 0 to 84, the quotient N obtained by dividing the grayscale value In by the predetermined threshold Th=85 is 0, and the reminder In' is 0 to 84. In a case where the grayscale value In of the multi-value data is one of the values 85 to 169, the quotient N obtained by dividing the grayscale value In by the predetermined threshold Th=85 is 1, and the reminder In' is 0 to 84. In a case where the grayscale value In of the multi-value data is one of the values 170 to 254, the quotient N obtained by dividing the grayscale value In by the predetermined threshold Th=85 is 2, and the reminder In' is 0 to 84. In a case where the grayscale value In of the multi-value data is 255, the quotient N obtained by dividing the grayscale value In by the predetermined threshold Th=85 is 3, and the reminder In' is 0.

Next, a reference is made to the dither pattern in step S502, and the reminder In' obtained in step S501 is compared with a threshold Dth set in each of the pixels in the dither pattern.

Figure 16A:
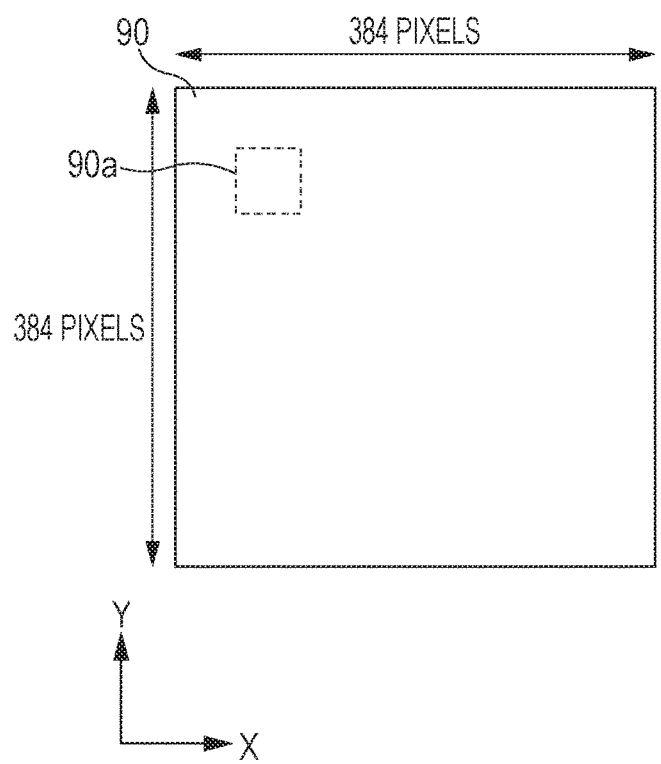
FIGS. 16A and 16B are schematic diagrams illustrating a dither pattern according to an exemplary embodiment of the subject disclosure.
Figure 16B:
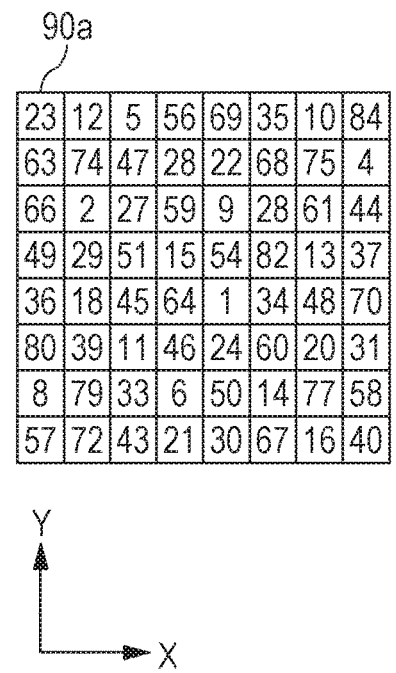

FIG. 16A schematically illustrates a dither pattern 90 used in the quantization processing according to the present exemplary embodiment. FIG. 16B is an expanded view illustrating an area 90a of part in the dither pattern illustrated in FIG. 16A. It should be noted that, according to the present exemplary embodiment, the dither pattern in which the threshold is set for determining the number of times to perform the ink ejection to each of the plurality of pixel areas is used as the dither pattern.

As illustrated in FIG. 16A, the dither pattern 90 used in the present exemplary embodiment has the size of 128 pixels in the X direction and 128 pixels in the Y direction. With respect to each of these 128×128 pixels, one of 84 values from 1 to 84 is set as the threshold of the pixel as illustrated in the expanded view of FIG. 16B.

In the quantization processing in step S403 according to the present exemplary embodiment, the reminder In' obtained on the basis of the grayscale value In indicated by the multi-value data at a certain pixel is compared with the threshold indicated by the dither pattern 90 in the corresponding pixel, and in a case where the reminder In' is higher than or equal to the threshold, the flow proceeds to step S503. Subsequently, in step S503, 1 is added to the quotient N obtained in step S502, and the resultant value is set as a grayscale value N' of the quantized data (=N+1).

On the other hand, in a case where the reminder In' is lower than the threshold, the flow proceeds to step S504, and the quotient N obtained in step S502 is set as the grayscale value N' of the quantized data (=N).

Herein, as may be understood from FIG. 15, in a case where the grayscale value of the multi-value data is one of the values 0 to 84, the quotient N is 0, and the reminder In' is one of the values 0 to 84. Therefore, the grayscale value N' of the quantized data becomes 1 or 0 in accordance with the threshold set with respect to the corresponding pixel. Since the number of pixels where the reminder In' is higher or equal to the threshold is increased as the reminder In' is higher, the number of pixels where the grayscale value N' is set as 1 is increased.

In a case where the grayscale value of the multi-value data is one of the values 85 to 169, the quotient N is 1, and the reminder In' is one of the values 0 to 84. Therefore, the grayscale value N' of the quantized data becomes 2 or 1 in accordance with the threshold set with respect to the corresponding pixel. Since the number of pixels where the reminder In' is higher or equal to the threshold is increased as the reminder In' is higher, the number of pixels where the grayscale value N' is set as 2 is increased.

In a case where the grayscale value of the multi-value data is one of the values 170 to 254, the quotient N is 2, and the reminder In' is one of the values 0 to 84. Therefore, the grayscale value N' of the quantized data becomes 2 or 3 in accordance with the threshold set with respect to the corresponding pixel. Since the number of pixels where the reminder In' is higher or equal to the threshold is increased as the reminder In' is higher, the number of pixels where the grayscale value N' is set as 3 is increased.

In a case where the grayscale value of the multi-value data is 255, the quotient N is 3, and the reminder In' is 0.

Therefore, the grayscale value of the quantized data becomes 3 irrespective of the threshold set with respect to the corresponding pixel.

In this manner, it may be understood that, as the grayscale value of the multi-value data is higher, the number of pixels where a large value is set as the grayscale value N' is increased.

Subsequently, the grayscale value N' is converted into n-bit (n≥2) information in step S505. According to the present exemplary embodiment, since n=2 is set as described above, the grayscale value N' is converted into one of the pixel values "00", "01", "10", and "11". More specifically, in the case of the grayscale value N'=0 at a certain pixel, the grayscale value N' is converted into information "00" indicating that the number of times to perform the ink ejection to the pixel is 0. In the case of the grayscale value N'=1 at a certain pixel, the grayscale value N' is converted into information "01" indicating that the number of times to perform the ink ejection to the pixel is 1. In the case of the grayscale value N'=2 at a certain pixel, the grayscale value N' is converted into information "10" indicating that the number of times to perform the ink ejection to the pixel is 2. In the case of the grayscale value N'=3 at a certain pixel, the grayscale value N' is converted into information "11" indicating that the number of times to perform the ink ejection to the pixel is 3.

FIGS. 17A to 17D schematically illustrate the quantized data generated in a case where the multi-value data having mutually different grayscale values is input to the area 90a in the dither pattern 90 illustrated in FIGS. 16A and 16B.

Herein, FIG. 17A illustrates the area 90a of the part in the dither pattern similarly as in the dither pattern illustrated in FIG. 16B. FIG. 17B illustrates quantized data 90a-128 generated when the multi-value data in which the grayscale value of each pixel is 128 is input to the area 90a of the part in the dither pattern 90. FIG. 17C illustrates quantized data 90a-129 generated when the multi-value data in which the grayscale value is 129 is uniformly input to the area 90a of the part in the dither pattern 90. FIG. 17D illustrates quantized data 90a-130 generated when the multi-value data in which the grayscale value is 130 is input to the area 90a of the part in the dither pattern 90.

In a case where the multi-value data in which the grayscale value In is 128 is uniformly input to the area 90a of the part in the dither pattern illustrated in FIG. 17A, the quotient N=1 and the reminder In'=43 are obtained in step S501. Therefore, in steps S502 to S504, the grayscale value N'=2 is determined in the pixel where the threshold Dth higher than or equal to 43 is set in the area 90a of the part in the dither pattern 90, the grayscale value N'=1 is determined in the pixel where the threshold Dth lower than or equal to 42 is set. Subsequently, in step S505, the pixel value "10" is assigned to the pixel where the grayscale value N'=2 is determined, and the pixel value "01" is assigned to the pixel where the grayscale value N'=1 is determined. Therefore, the M-value data as illustrated in FIG. 17B is generated.

Next, in a case where the multi-value data in which the grayscale value In is 129 is uniformly input to the area 90a of the part in the dither pattern illustrated in FIG. 17A, the quotient N=1 and the reminder In'=44 are obtained in step S501. Therefore, in steps S502 to S504, the grayscale value N'=2 is determined in the pixel where the threshold Dth higher than or equal to 44 is set in the area 90a of the part in the dither pattern 90, and the grayscale value N'=1 is determined in the pixel where the threshold Dth is lower than or equal to 43. Subsequently, in step S505, the pixel value "10" is assigned to the pixel where the grayscale value N'=2 is determined, and the pixel value "01" is assigned to the pixel where the grayscale value N'=1 is determined. Therefore, the M-value data as illustrated in FIG. 17C is generated.

Herein, the same pixel value is set in pixel other than pixels 2001 in the M-value data illustrated in illustrated in FIGS. 17B and 17C. However, it may be understood that the pixel value "01" indicating that the ink is ejected once to the pixels 2001 is set in the M-value data illustrated in FIG. 17B, whereas the pixel value "10" indicating that the ink is ejected twice to the pixels 2001 is set in the M-value data illustrated in FIG. 17C. From this, it may be understood that the ink can be ejected to the area on the recording medium corresponding to the area 90a of the part in the dither pattern 90 in a case where the multi-value data in which the grayscale value is 129 is input once more than the number of times to perform the ink ejection in a case where the multi-value data in which the grayscale value is 128 is input.

Next, in a case where the multi-value data in which the grayscale value In is 130 is input to the area 90a of the part in the dither pattern illustrated in FIG. 17A, the quotient N=1 and the reminder In'=45 are obtained in step S501. Therefore, in steps S502 to S504, the grayscale value N'=2 is determined in the pixel where the threshold Dth higher than or equal to 45 is set in the area 90a of the part in the dither pattern 90, the grayscale value N'=1 is determined in the pixel where the threshold Dth lower than or equal to 44 is set. Subsequently, in step S505, the pixel value "10" is assigned to the pixel where the grayscale value N'=2 is determined, and the pixel value "01" is assigned to the pixel where the grayscale value N'=1 is determined. Therefore, the M-value data as illustrated in FIG. 17D is generated.

Herein, the same pixel value is set in pixels other than pixels 2002 in the M-value data illustrated in FIGS. 17C and 17D. However, it may be understood that the pixel value "01" indicating that the ink is ejected once to the pixels 2002 is set in the M-value data illustrated in FIG. 17C, whereas the pixel value "10" indicating that the ink is ejected twice to the pixels 2002 is set in the M-value data illustrated in FIG. 17D. From this, it may be understood that the ink can be ejected to the area on the recording medium corresponding to the area 90a of the part in the dither pattern 90 in a case where the multi-value data in which the grayscale value is 130 is input once more than the number of times to perform the ink ejection in a case where the multi-value data in which the grayscale value is 129 is input.

In this manner, in the quantization processing according to the present exemplary embodiment, it is possible to generate the quantized data in which the number of times to perform the ink ejection is increased as the grayscale value indicated by the multi-value data is higher.

Distribution Processing

The quantized data is distributed to the plurality of scanning operations by applying a plurality of mask patterns, in which the number of times to permit the ink ejection is specified with respect to a plurality of respective pixel areas, to the n-bit (n≥2) M-value (M≥3) quantized data generated in the above-described quantization processing.

FIGS. 18A, 18B, 18C1 to 18C4, 18D1 to 18D4, and 18E are explanatory diagrams for describing a process of generating the recording data by using the quantized data each having 2-bit information and the mask patterns in which the number of times to permit the ink ejection is specified. FIG. 19 illustrates a decode table used at the time of the generation of the recording data illustrated in FIGS. 18A, 18B, 18C1 to 18C4, 18D1 to 18D4, and 18E.

FIG. 18A schematically illustrates 16 pixels 700 to 715 in a certain area. It should be noted that, for simplicity, the description will be given by using the pixel constituted by the pixel area equivalent to the 16 pixels herein.

FIG. 18B illustrates an example of the quantized data corresponding to the unit area.

Herein, a case of n=2 will be described as an example according to the present exemplary embodiment. In a case where 2-bit information (pixel value) constituting the multi-value data corresponding to a certain pixel is "00" according to the present exemplary embodiment as described above, the ink is not ejected to the pixel at all. In a case where the pixel value is "01", the ink is ejected to the corresponding pixel once. In a case where the pixel value is "10", the ink is ejected to the corresponding pixel twice. In a case where the pixel value is "11", the ink is ejected to the corresponding pixel three times.

With regard to the multi-value data illustrated in FIG. 18B, for example, since the pixel value of the pixels 703, 707, 711, and 715 is "00", the ink is not ejected to the pixel area corresponding to the pixels 703, 707, 711, and 715 at all. For example, since the pixel value of the pixels 700, 704, 708, and 712 is "11", the ink is ejected to the pixel area corresponding to the pixels 700, 704, 708, and 712 three times.

FIGS. 18C1 to 18C4 respectively correspond to the first to fourth scanning operations and illustrate examples of the mask patterns applied to the multi-value data illustrated in FIG. 18B. That is, a mask pattern 505 corresponding to the first scanning illustrated in FIG. 18C1 is applied to the multi-value data illustrated in FIG. 18B to generate recording data used in the first scanning. Similarly, mask patterns 506, 507, and 508 respectively illustrated in FIGS. 18C2, 18C3, and 18C4 are applied to the multi-value data illustrated in FIG. 18B to respectively generate recording data used in the second, third, and fourth scanning operations.

Herein, one of "00", "01", "10", and "11" is assigned to each of the pixels in the mask patterns respectively illustrated in FIGS. 18C1 to 18C4 as a value indicated by the 2-bit information (hereinafter, will be also referred to as a code value).

Herein, it may be understood by making a reference to the decode table illustrated in FIG. 19 that, in a case where the code value is "00", the ink is not ejected even when the pixel value of the corresponding pixel is one of "00", "01", "10", and "11". That is, this case corresponds to a state in which the code value "00" in the mask pattern does not permit the ejection of the ink at all (the number of times to permit the ink ejection is 0). In the following explanation, the pixel in the mask pattern to which the code value "00" is assigned is also referred to as a recording prohibition pixel.

On the other hand, it may be understood by making a reference to the decode table illustrated in FIG. 19 that, in a case where the code value is "01", the ink is not ejected when the pixel value of the corresponding pixel is "00", "01", or "10", but the ink is ejected when the pixel value is "11". In other words, this case corresponds to a state in which the code value "01" permits the ejection of the ink only once (the number of times to permit the ink ejection is 1) with respect to the four combinations of the pixel values ("00", "01", "10", and "11").

In a case where the code value is "10", the ink is not ejected when the pixel value of the corresponding pixel is "00" or "01", but the ink is ejected when the pixel value is "10" or "11". That is, this case corresponds to a state in which the code value "10" permits the ejection of the ink twice (the number of times to permit the ink ejection is 2) with respect to the four combinations of the pixel values.

Furthermore, in a case where the code value is "11", the ink is not ejected when the pixel value of the corresponding pixel is "00", but the ink is ejected when the pixel value is "01", "10", or "11". That is, this case corresponds to a state in which the code value "11" permits the ejection of the ink three times (the number of times to permit the ink ejection is 3) with respect to the four combinations of the pixel values. It should be noted that, in the following explanation, the pixel in the mask pattern to which the code value "01", "10", or "11" is assigned is also referred to as a recording permission pixel.

Herein, the mask pattern including the n-bit information used in the present exemplary embodiment is set on the basis of the following Condition 1 and Condition 2.

Condition 1

Herein, a setting is established in which $((2^m)-1)$ pieces of recording permission pixels are arranged in a plurality of pixels located in the same position in a plurality of mask patterns. The $((2^n)-1)$ recording permission pixels permit mutually different numbers to perform the ejection of the ink. More specifically, according to the present exemplary embodiment, since m=2 is set according to the present exemplary embodiment, one of the code values "01", "10", and "11" is assigned one each to 3 $(=2^2-1)$ pixels among the four pixels located in the same position in the four mask patterns illustrated in FIGS. 18C1 to 18C4 (recording permission pixels), and the code value "00" is assigned to the remaining 1 (=4-3) pixel (recording prohibition pixel).

For example, with respect to the pixel 700, the code value "01" is assigned in the mask pattern illustrated in FIG. 18C3, the code value "10" is assigned in the mask pattern illustrated in FIG. 18C2, and the code value "11" is assigned in the mask pattern illustrated in FIG. 18C1. The code value "00" is assigned to the pixel 700 in the remaining mask pattern illustrated in FIG. 18C4. In other words, the pixel 700 is the recording permission pixel in the mask patterns illustrated in FIGS. 18C1, 18C2, and 18C3, and the pixel 700 is the recording prohibition pixel in the mask pattern illustrated in FIG. 18C4.

With respect to the pixel 701, the code value "01" is assigned in the mask pattern illustrated in FIG. 18C2, the code value "10" is assigned in the mask pattern illustrated in FIG. 18C1, and the code value "11" is assigned in the mask pattern illustrated in FIG. 18C4. The code value "00" is assigned to the pixel 701 in the remaining mask pattern illustrated in FIG. 18C3. In other words, the pixel 701 is the recording permission pixel in the mask patterns illustrated in FIGS. 18C1, 18C2, and 18C4, and the pixel 701 is the recording prohibition pixel in the mask pattern illustrated in FIG. 18C3.

With the above-described configuration, it is possible to generate the recording data in which, even when the pixel value at a certain pixel is one of "00", "01", "10", and "11", the ink is ejected to the pixel area only corresponding to the pixel the number of times to perform the ink ejection corresponding to the pixel value.

Condition 2

The mutually substantially equal number of recording permission pixels corresponding to the code value "01" are arranged in the mask patterns respectively illustrated in FIGS. 18C1 to 18C4. More specifically, the code value "01" is assigned to the four pixels including the pixels 702, 707, 708, and 713 in the mask pattern illustrated in FIG. 18C1. The code value "01" is assigned to the four pixels including the pixels 701, 706, 711, and 712 in the mask pattern illustrated in FIG. 18C2. The code value "01" is assigned to the four pixels including the pixels 700, 705, 710, and 715 in the mask pattern illustrated in FIG. 18C3. The code value "01" is assigned to the four pixels including the pixels 703, 704, 709, and 714 in the mask pattern illustrated in FIG. 18C4. That is, the four recording permission pixels corresponding to the code value "01" are arranged in each of the four mask patterns respectively illustrated in FIGS. 18C1 to 18C4.

Similarly, the mutually same number of recording permission pixels corresponding to the code value "10" are arranged in the mask patterns respectively illustrated in FIGS. 18C1 to 18C4. Furthermore, the mutually same number of recording permission pixel corresponding to the code value "11" are also arranged in the mask patterns respectively illustrated in FIGS. 18C1 to 18C4.

It should be noted that the case has been described herein in which the mutually equal number of recording permission pixels corresponding to each of the code values "01", "10", and "11" in the respective mask patterns are arranged, but in actuality, the mutually substantially equal number of recording permission pixels may be arranged.

Accordingly, when the multi-value data is distributed to the four scanning operations to generate the recording data by using the mask patterns respectively illustrated in FIGS. 18C1 to 18C4, it is possible to mutually substantially equalize recording rates in the respective four scanning operations.

FIGS. 18D1 to 18D4 each illustrate recording data generated by applying the mask patterns respectively illustrated in FIGS. 18C1 to 18C4 to the multi-value data illustrated in FIG. 18B.

For example, the pixel value of the multi-value data is "11", and the code value of the mask pattern is "11" in the pixel 700 in the recording data corresponding to the first scanning illustrated in FIG. 18D1. For this reason, as may be understood from the decode table illustrated in FIG. 19, the ejection of the ink ("1") is specified in the pixel 700. Since the pixel value of the multi-value data is "10", and the code value of the mask pattern is "10", the ejection of the ink ("1") is specified in the pixel 701. Since the pixel value of the multi-value data is "11", and the code value of the mask pattern is "00", the non-ejection of the ink ("0") is specified in the pixel 704.

The ink is ejected in the first to fourth scanning operations in accordance with the thus generated recording data respectively illustrated in FIGS. 18D1 to 18D4. For example, as may be understood from the recording data illustrated in FIG. 18D1, the ink is ejected to the pixel areas on the recording medium corresponding to the pixels 700, 701, 705, 708, 710, and 712 in the first scanning operation.

FIG. 18E illustrates logical sums of the recording data respectively illustrated in FIGS. 18D1 to 18D4. While the ink is ejected in accordance with the recording data respectively illustrated in FIGS. 18D1 to 18D4, the ink is ejected to the pixel areas corresponding to the respective pixels the number of times indicated in FIG. 18E.

For example, in the pixel 700, the ejection of the ink is specified in the recording data corresponding to the first, second, and third scanning operations illustrated in FIGS. 18D1, 18D2, and 18D3. Therefore, as illustrated in FIG. 18E, the ink is ejected to the pixel area corresponding to the pixel 700 three times in total.

In the pixel 701, the ejection of the ink is specified in the recording data corresponding to the first and fourth scanning operations illustrated in FIGS. 18D1 and 18D4. Therefore, as illustrated in FIG. 18E, the ink is ejected to the pixel area corresponding to the pixel 701 twice in total.

When the recording data illustrated in FIG. 18E is compared with the multi-value data illustrated in FIG. 18B, it may be understood that the recording data is generated such that the ink is ejected the number of times to perform the ink ejection corresponding to the pixel value of the multi-value data in each of the pixels. For example, in the pixels 700, 705, 708, and 712, the pixel value of the multi-value data illustrated in FIG. 18B is "11", and the number of times to perform the ink ejection indicated by the logical sum of the generated recording data is also 3.

According to the above-described configuration, it is possible to generate the 1-bit recording data used in each of the plurality of scanning operations on the basis of the multi-value data having the plural-bit information and the mask pattern.

The mask patterns actually used in the present exemplary embodiment will be described in detail with reference to FIGS. 20A1, 20A2, 20B1, 20B2, 20C1, 20C2, 20D1, and 20D2.

FIG. 20A1 schematically illustrates a mask pattern 91 corresponding to the first scanning operation with respect to the unit area used in the distribution processing according to the present exemplary embodiment. FIG. 20A2 is an expanded view illustrating an area 91a of part in the mask pattern 91.

FIG. 20B1 schematically illustrates a mask pattern 92 corresponding to the second scanning operation with respect to the unit area used in the distribution processing according to the present exemplary embodiment. FIG. 20B2 is an expanded view illustrating an area 92a of part in the mask pattern 92.

FIG. 20C1 schematically illustrates a mask pattern 93 corresponding to the third scanning operation with respect to the unit area used in the distribution processing according to the present exemplary embodiment. FIG. 20C2 is an expanded view illustrating an area 93a of part in the mask pattern 93.

FIG. 20D1 schematically illustrates a mask pattern 94 corresponding to the fourth scanning operation with respect to the unit area used in the distribution processing according to the present exemplary embodiment. FIG. 20D2 is an expanded view illustrating an area 94a of part in the mask pattern 94.

As illustrated in FIGS. 20A1, 20B1, 20C1, and 20D1, each of the mask patterns 91 to 94 used in the present exemplary embodiment has the size of 128 pixels in the X direction and 128 pixels in the Y direction. This is the same size as the dither pattern 90 illustrated in FIGS. 17A to 17D used in the present exemplary embodiment. As illustrated in the expanded views of FIGS. 20A2, 20B2, 20C2, and 20D2, information (code value) indicating the number of times to permit the recording to each pixel is specified with respect to each of these 128×128 pixels. The code value ("00", "01", "10", "11") to each pixel has a definition similar to the above-described definition and corresponds to the number of times to permit the ink ejection as illustrated in the decode table illustrated in FIG. 19.

Herein, the recording permission pixels are arranged at mutually complementary and exclusive positions in the mask patterns 91 to 94 illustrated in FIGS. 20A1, 20A2, 20B1, 20B2, 20C1, 20C2, 20D1, and 20D2. That is, with respect to the respective pixels, the prohibition to perform the ink ejection is specified in one mask pattern among the four mask patterns 91 to 94 ("00"), the permission to perform the ink ejection once is specified in another mask pattern ("01"), the permission to perform the ink ejection twice is specified in another mask pattern ("10"), and the permission to perform the ink ejection three times is specified in another mask pattern ("11").

Accordingly, for example, in a case where the quantized data specifying that the ink is ejected once is input to all of the 128×128 pixels corresponding to the mask patterns 91 to 94, the ink can be ejected to the respective pixel areas in one scanning operation among the first to fourth scanning operations. In a case where the quantized data specifying that the ink is ejected twice is input to all of the 128×128 pixels corresponding to the mask patterns 91 to 94, the ink can be ejected to the respective pixel areas in two scanning operations among the first to fourth scanning operations. In a case where the quantized data specifying that the ink is ejected three times is input to all of the 128×128 pixels corresponding to the mask patterns 91 to 94, the ink can be ejected to the respective pixel areas in three scanning operations among the first to fourth scanning operations.

The mask patterns 91 to 94 illustrated in FIGS. 20A1, 20A2, 20B1, 20B2, 20C1, 20C2, 20D1, and 20D2 are determined to have the mutually substantially same number of pixels where the code value "01" is set. Accordingly, for example, in a case where the quantized data specifying that the ink is ejected once (the pixel value is "01") is input to all of the 128×128 pixels corresponding to the mask patterns 81 to 84, the number of times to perform the ink ejection in each of the first to fourth scanning operations can be set as substantially the same. Similarly, the mask patterns are determined to have the mutually substantially same number of pixels where the code value "10" is set. Furthermore, the mask patterns are determined to have the mutually substantially same number of pixels where the code value "11" is set.

It should be noted that the above-described mask pattern is an example of mask patterns to which the present exemplary embodiment can be applied, and a different mask pattern can be appropriately set by taking other elements into account.

Synchronization of the Dither Pattern and the Mask Pattern

According to the present exemplary embodiment, recording data is generated by using the dither pattern 90 illustrated in FIGS. 16A and 16B and the mask patterns 91 to 94 illustrated in FIGS. 20A1, 20A2, 20B1, 20B2, 20C1, 20C2, 20D1, and 20D2. Herein, similarly as in the first exemplary embodiment, the dither pattern 90 and each of the mask patterns 91 to 94 are determined while being associated with each other.

More specifically, according to the present exemplary embodiment, in a case where the multi-value data specifying the grayscale value of 64 (=256×0.25) corresponding to the 25% grayscale value is quantized by using the dither pattern 90, and the generated quantized data is distributed to the first scanning by using the mask pattern 91, the dither pattern 90 and the mask pattern 91 are determined while being associated with each other such that the dispersibility of the pixels where the ejection of the ink is specified by the generated recording data corresponding to the first scanning is set to be high to some extent. That is, the dither pattern 90 and the mask pattern 91 are determined such that it is possible to generate the recording data in which the pixels where the ejection of the ink is specified spatially evenly exist as illustrated in FIG. 1C1 instead of the recording data in which the pixels where the ejection of the ink is specified have the conspicuous spatial deviation as illustrated in FIG. 1B1.

In more detail, the dither pattern 90 and the mask pattern 91 are preferably determined in a manner that an arrangement of the dots based on the generated recording data does not exhibit the white noise characteristics. The dither pattern 90 and the mask pattern 91 are more preferably determined in a manner that the arrangement of the dots based on the generated recording data does not exhibit the red noise characteristics. Furthermore, the dither pattern 90 and the mask pattern 91 are still more preferably determined in a manner that the arrangement of the dots based on the generated recording data exhibits the blue noise characteristics.

Furthermore, according to the present exemplary embodiment, in a case where the multi-value data specifying the grayscale value of 128 (=256×0.5) corresponding to the 50% grayscale value, the multi-value data specifying the grayscale value of 192 (=256×0.75) corresponding to the 75% grayscale value, and the multi-value data specifying the grayscale value of 256 (=256×1) corresponding to the 100% grayscale value are respectively similarly input, the dither pattern 90 and the mask pattern 91 are determined while being associated with each other such that the dispersibility of the pixels where the ejection of the ink is specified by the generated recording data corresponding to the first scanning is set to be high to some extent.

In addition, the synchronization of the mask pattern 91 and the dither pattern 90 corresponding to the first scanning has been described herein, and the mask pattern 92 corresponding to the second scanning, the mask pattern 93 corresponding to the third scanning, and the mask pattern 94 corresponding to the fourth scanning are respectively similarly synchronized with the dither pattern 90.

Therefore, the dither pattern 90 and each of the mask patterns 91 to 94 used in the present exemplary embodiment are determined while being associated with each other at the respective grayscale values of 25%, 50%, 75%, and 100%.

Even in a case where the dither pattern 90 and the mask patterns 91 to 94 described above are used, it is possible to attain the advantages as described in the first exemplary embodiment.

For example, in a case where the multipass recording as illustrated in FIG. 6 is performed, the mask pattern parts obtained by dividing the mask patterns 91 to 94 illustrated in FIGS. 20A1, 20B1, 20C1, and 20D1 in the Y direction into two parts and the mask pattern parts obtained by dividing the mask patterns 91 to 94 in the Y direction into three parts are stored in the ROM 302. At the time of the quantization, as described with reference to FIG. 11, the dither pattern 90 is adopted by being offset in the Y direction such that the end part on the -Y direction side of the dither pattern 90 corresponds to the multi-value data corresponding to the unit area 212. Then, the mask pattern parts corresponding to the area within the dither pattern 90 applied to the quantized data at the time of the quantization is adopted in the distribution processing to generate the recording data. As a result, it is possible to perform the recording in which the spatial deviation of the recording image is reduced while the decrease in the throughput is suppressed.

Other Exemplary Embodiments

It should be noted that, according to the above-described respective exemplary embodiments, the mode has been described in which attention is paid to the leading end area of the recording medium where the nipping by the discharging roller pair is not performed, and the dither pattern is offset such that the area of the end part on the −Y direction side of the dither pattern corresponds to the unit area located in the end part on the −Y direction side in the leading end area, but the execution can also be performed in other modes. Since the nipping of the trailing end area of the recording medium by the feeding roller pair is not performed, the conveyance misalignment may occur similarly as in the leading end area. Therefore, when control similar to those of the respective exemplary embodiments is also performed with regard to the trailing end area, it is possible to attain an advantage similar to those of the respective exemplary embodiments.

More specifically, the dither pattern may be offset such that the area in the end part on the +Y direction side of the dither pattern corresponds to the unit area located in the end part on the +Y direction side in the trailing end area. The unit area located in the end part on the +Y direction side in the trailing end area corresponds to the unit area where the recording medium is nipped by both the feeding roller pair and the discharging roller pair until the L-th pass is performed, and the recording is performed for the first time in the (L+1)-th pass in a case where the nipping by the feeding roller pair is not performed after the L-th pass is performed.

It should be noted that the control according to the respective exemplary embodiments may be performed with respect to only the leading end area, performed with respect to only the trailing end area, or performed with respect to both the leading end area and the trailing end area. In addition, the leading end area or the trailing end area may be divided into three or more parts.

In addition, according to the above-described respective exemplary embodiments, the mode has been described in which the size in the Y direction of the dither pattern (384 pixels) is an integer multiple of the two types of the conveyance amounts (128 pixels and 192 pixels) in the multipass recording, but the size may be slightly deviated from an integer multiple of the conveyance amount. It should be noted however that, as the deviation from the integer multiple of the conveyance amount becomes larger, the shift between the dither pattern and the quantized data becomes larger, and the influence affecting on the image quality becomes larger. For this reason, as described in the present exemplary embodiment, the size in the Y direction of the dither pattern is preferably an integer multiple of the conveyance amount.

In addition, according to the above-described respective exemplary embodiments, the mode has been described in which the mask pattern has the same size in the Y direction as compared with the dither pattern, but any size may be adopted as long as the synchronization with the dither pattern can be executed. It should be noted however that the mask pattern and the dither pattern preferably mutually have the same size to appropriately perform the synchronization of the mask pattern and the dither pattern.

In addition, according to the above-described respective exemplary embodiments, the mode has been described in which the dither pattern is used as the quantization pattern, but the execution can also be performed in other modes. For example, a mode may be adopted in which a dot arrangement pattern that specifies the number of times to eject the ink and the position in accordance with the grayscale value of the multi-value data is used as the quantization pattern.

In addition, according to the above-described respective exemplary embodiments, the mode has been described in which the quantization pattern itself is offset, but the execution can also be performed in other modes as long as the positional relationship between the quantization pattern and the unit area can be controlled in the same manner. For example, the respective thresholds set in the quantization pattern may be offset instead of offsetting the quantization pattern itself. In addition, for example, a timing for reading out the quantization patterns may be varied in a system where the stored quantization patterns are sequentially read out in the Y direction to be used in the quantization processing.

In addition, the recording apparatus and the recording method using the recording apparatus have been described in the respective exemplary embodiments, but the present disclosure can also be applied to an image processing apparatus configured to generate data used to perform the recording method according to the respective exemplary embodiments or an image processing method. In addition, the present disclosure can also be applied to a mode in which the program for performing the recording method according to the respective exemplary embodiments is separately prepared in addition to the recording apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The recording apparatus according to the exemplary embodiment of the present disclosure can perform the recording in which the throughput is improved while the spatial deviation of the image is suppressed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-192726 filed Sep. 30, 2016, which is hereby incorporated by reference herein in its entirety.

What is claimed is:

1. A recording apparatus that performs recording by using a recording head including a plurality of ejection openings for ejecting ink which are arranged in an array direction, the recording apparatus comprising:

a scanning unit configured to cause the recording head to perform a plurality of scanning operations relatively in a scanning direction intersecting with the array direction with respect to a unit area on a recording medium;

a conveyance unit configured to convey, after a recording operation with respect to the recording medium is started, the recording medium in a conveyance direction intersecting with the scanning direction by a first conveyance amount for a predetermined times followed by conveying the recording medium in the conveyance direction by a second conveyance amount which is larger than the first conveyance amount;

an obtaining unit configured to obtain multi-value data corresponding to an image to be recorded on the recording medium;

a quantization unit configured to generate quantized data by applying a quantization pattern to the multi-value data in the array direction for a multiple times;

a distribution unit configured to generate recording data used for the plurality of scanning operations by distributing the quantized data to the plurality of scanning operations on a basis of a plurality of mask patterns corresponding to the plurality of scanning operations, each of the plurality of mask patterns being determined while being mutually associated with the quantization pattern; and a control unit configured to control the recording operation in a manner that the ink is ejected on a basis of the generated recording data, wherein the quantization unit sets a position of the application of the quantization pattern with respect to a leading edge of the recording medium a position of such that an end part on an upstream side in the conveyance direction in an area where the image is recorded on the recording medium in a last scanning operation of the plurality of scanning operations before conveying the recording medium by the second amount is a switching position in repeating the application of the quantization pattern in the array direction for the multiple times.

2. The recording apparatus according to claim 1, wherein the distribution unit applies a plurality of mask pattern parts obtained by dividing each of the plurality of mask patterns in the array direction to an area quantized by using an area of a part in the quantization pattern in the quantized data without using an area of another part in the quantization pattern, each of the plurality of mask pattern parts corresponding to the area of the part in the quantization pattern.

3. The recording apparatus according to claim 1, wherein a length in the array direction of the quantization pattern is an integer multiple of the first conveyance amount.

4. The recording apparatus according to claim 3, wherein a length in the array direction of each of the plurality of mask patterns is an integer multiple of the first conveyance amount.

5. The recording apparatus according to claim 1, wherein a length in the array direction of the quantization pattern is an integer multiple of the second conveyance amount.

6. The recording apparatus according to claim 5, wherein a length in the array direction of each of the plurality of mask patterns is an integer multiple of the second conveyance amount.

7. The recording apparatus according to claim 1, further comprising a first conveyance roller pair provided on the upstream side in the conveyance direction with respect to the recording head and a second conveyance roller pair provided on the downstream side in the conveyance direction with respect to the recording head, wherein the conveyance unit conveys the recording medium by using the first conveyance roller pair without using the second conveyance roller pair during a period from a start of the recording operation to an end of conveying the recording medium for the predetermined times, and conveys the recording medium by using both the first conveyance roller pair and the second conveyance roller pair after the end of conveying the recording medium for the predetermined times.

8. The recording apparatus according to claim 7, wherein, before recording on a trailing edge of the recording medium is ended and after conveying the recording medium by the second conveyance amount, the conveyance unit conveys the recording medium by the first conveyance amount, and wherein the quantization unit sets a position of the application of the quantization pattern with respect to the trailing edge of the recording medium such that the quantization pattern is switched from the position of the end part on the downstream side in the conveyance direction in the area where the image is recorded on the recording medium in a scanning operation of the plurality of scanning operations after conveying the recording medium for a first time by the first conveyance amount.

9. The recording apparatus according to claim 8, wherein the conveyance unit conveys the recording medium by using both the first conveyance roller pair and the second conveyance roller pair until the second scanning operation is performed during conveying the recording medium by the second conveyance amount, and conveys the recording medium by using the second conveyance roller pair without using the first conveyance roller pair after conveying the recording medium by the second conveyance amount.

10. The recording apparatus according to claim 1, wherein a threshold for specifying permission or prohibition of the ink ejection with respect to each of a plurality of pixels is set in the quantization pattern, and wherein permission or prohibition of the ink ejection with respect to each of the plurality of pixels is specified in each of the plurality of mask patterns.

11. The recording apparatus according to claim 1, wherein a threshold for specifying a number of times to perform the ink ejection with respect to each of a plurality of pixels is set in the quantization pattern, and wherein permission or prohibition of the ink ejection in accordance with the number of times to perform the ink ejection with respect to each of the plurality of pixels is specified in each of the plurality of mask patterns.

12. The recording apparatus according to claim 1, wherein the quantization pattern and a first mask pattern among the plurality of mask patterns are determined while being mutually associated with each other such that an arrangement of dots based on the recording data, which is generated by the distribution unit on a basis of the quantized data generated by the quantization unit in a case where a value indicated by the multi-value data is a first value and the first mask pattern, does not exhibit white noise characteristics.

13. The recording apparatus according to claim 12, wherein the quantization pattern and the first mask pattern are determined while being mutually associated with each other such that the arrangement of the dots based on the recording data, which is generated by the distribution unit on a basis of the quantized data generated by the quantization unit in a case where the value indicated by the multi-value data is the first value and the first mask pattern, does not exhibit red noise characteristics.

14. The recording apparatus according to claim 13, wherein the quantization pattern and the first mask pattern are determined while being mutually associated with each other such that the arrangement of the dots based on the recording data, which is generated by the distribution unit on a basis of the quantized data generated by the quantization unit in a case where the value indicated by the multi-value data is the first value and the first mask pattern, exhibits blue noise characteristics.

15. The recording apparatus according to claim 12, wherein the quantization pattern and the first mask pattern are determined while being mutually associated with each other such that the arrangement of the dots based on the recording data, which is generated by the distribution unit on a basis of the quantized data generated by the quantization unit in a case where the value indicated by the multi-value data is a second value that is different from the first value and the first mask pattern, does not exhibit the white noise characteristics.

16. The recording apparatus according to claim 12, wherein the quantization pattern and a second mask pattern that is different from the first mask pattern are determined while being mutually associated with each other such that the arrangement of the dots based on the recording data, which is generated by the distribution unit on a basis of the quantized data generated by the quantization unit in a case where the value indicated by the multi-value data is the first value and the second mask pattern, does not exhibit the white noise characteristics.

17. A recording apparatus that performs recording by using a recording head including a plurality of ejection openings for ejecting ink which are arranged in an array direction, the recording apparatus comprising:
a scanning unit configured to cause the recording head to perform a plurality of scanning operations relatively in a scanning direction intersecting with the array direction with respect to a unit area on a recording medium;
a conveyance unit configured to convey the recording medium by a first conveyance amount with respect to a center area of the recording medium in a conveyance direction intersecting with the scanning direction, and convey the recording medium by a second conveyance amount, which is smaller than the first conveyance amount, with respect to a trailing edge area of the recording medium on an upstream side in the conveyance direction compared to the center area;
an obtaining unit configured to obtain multi-value data corresponding to an image recoded on the recording medium;
a quantization unit configured to generate quantized data by applying a quantization pattern to the multi-value data in the array direction for a multiple times;
a distribution unit configured to generate recording data used for the plurality of scanning operations by distributing the quantized data to the plurality of scanning operations on a basis of a plurality of mask patterns corresponding to the plurality of scanning operations, each of the plurality of mask patterns being determined while being mutually associated with the quantization pattern; and
a control unit configured to control the recording operation in a manner that the ink is ejected on a basis of the recording data,
wherein the quantization unit sets a position of the application of the quantization pattern such that a position of an end part on the upstream side in the conveyance direction in an area where the image is recorded on the recording medium in a last scanning operation of the plurality of scanning operations before conveying the recording medium by the second amount is a switching position in repeating the application of the quantization pattern in the array direction for the multiple times.

18. The recording apparatus according to claim 17, further comprising a first conveyance roller pair provided on an upstream side in the conveyance direction with respect to the recording head and a second conveyance roller pair provided on the downstream side in the conveyance direction with respect to the recording head,
wherein the conveyance unit conveys the recording medium by using both the first conveyance roller pair and the second conveyance roller pair in conveying the recording medium by the first conveyance amount conveys the recording medium by using the second conveyance roller pair without using the first conveyance roller pair in conveying the recording medium by the second conveyance amount.

19. A recording method of performing recording by using a recording head including a plurality of ejection openings for ejecting ink which are arranged in an array direction, the recording method comprising:
causing the recording head to perform a plurality of scanning operations relatively in a scanning direction intersecting with the array direction with respect to a unit area on a recording medium;
conveying, after a recording operation with respect to the recording medium is started, the recording medium in a conveyance direction intersecting with the scanning direction by a first conveyance amount for a predetermined times and followed by conveying the recording medium in the conveyance direction by a second conveyance amount which is larger than the first conveyance amount;
obtaining multi-value data corresponding to an image to be recoded on the recording medium;
generating quantized data by applying a quantization pattern to the multi-value data in the array direction for a multiple times;
generating recording data used for the plurality of scanning operations by distributing the quantized data to the plurality of scanning operations on a basis of a plurality of mask patterns corresponding to the plurality of scanning operations, each of the plurality of mask patterns being determined while being mutually associated with the quantization pattern; and
controlling the recording operation in a manner that the ink is ejected on a basis of the generated recording data,
wherein the generating of the quantized data includes setting a position of applying the quantization pattern with respect to a leading edge of the recording medium such that a position of an end part on an upstream side in the conveyance direction in an area where the image is recorded on the recording medium in a last scanning operation of the plurality of scanning operations before conveying the recording medium by the second amount is a switching position in repeating the application of the quantization pattern in the array direction for the multiple times.

20. A recording method of performing recording by using a recording head including a plurality of ejection openings for ejecting ink which are arranged in an array direction, the recording method comprising:

causing the recording head to perform a plurality of scanning operations relatively in a scanning direction intersecting with the array direction with respect to a unit area on a recording medium;

conveying the recording medium by a first conveyance amount with respect to a center area of the recording medium, in a conveyance direction intersecting with the scanning direction, and conveying the recording medium by a second conveyance amount, which is smaller than the first conveyance amount, with respect to a trailing edge area of the recording medium on an upstream side in the conveyance direction compared to the center area;

obtaining multi-value data corresponding to an image recoded on the recording medium;

generating quantized data by applying a quantization pattern to the multi-value data in the array direction for a multiple times;

generating recording data used for the plurality of scanning operations by distributing the quantized data to the plurality of scanning operations on a basis of a plurality of mask patterns corresponding to the plurality of scanning operations, each of the plurality of mask patterns being determined while being mutually associated with the quantization pattern; and controlling the recording operation in a manner that the ink is ejected on a basis of the generated recording data, wherein the generating of the quantization includes setting a position of applying the quantization pattern such that a position of an end part on the upstream side in the conveyance direction in an area where the image is recorded on the recording medium in a last scanning operation of the plurality of scanning operations before conveying the recording medium by the second amount is a switching position in repeating the application of the quantization pattern in the array direction for the multiple times.

* * * * *